(12) United States Patent
Binet et al.

(10) Patent No.: US 12,199,838 B2
(45) Date of Patent: Jan. 14, 2025

(54) SOFTWARE-DEFINED COMPUTE NODES ON MULTI-SoC ARCHITECTURES

(71) Applicant: Motional AD LLC, Boston, MA (US)

(72) Inventors: Guillaume Binet, Pittsburgh, PA (US); Shailendra Deva, Saratoga, CA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 18/307,384

(22) Filed: Apr. 26, 2023

(65) Prior Publication Data

US 2024/0089181 A1    Mar. 14, 2024

Related U.S. Application Data

(60) Provisional application No. 63/363,620, filed on Apr. 26, 2022.

(51) Int. Cl.
*H04L 41/40* (2022.01)

(52) U.S. Cl.
CPC .................. *H04L 41/40* (2022.05)

(58) Field of Classification Search
CPC ...................................... H04L 41/40
See application file for complete search history.

(56) References Cited

U.S. PATENT DOCUMENTS

| | | |
|---|---|---|
| 2002/0152420 A1 | 10/2002 | Chaudhry et al. |
| 2006/0236168 A1 | 10/2006 | Wolfe et al. |
| 2013/0024721 A1 | 1/2013 | Kabulepa et al. |
| 2020/0310394 A1 | 10/2020 | Wouhaybi et al. |

(Continued)

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

(Continued)

*Primary Examiner* — Viet D Vu
*Assistant Examiner* — Zia Khurshid
(74) *Attorney, Agent, or Firm* — Knobbe, Martens, Olson & Bear, LLP

(57) ABSTRACT

Provided are methods for forming redundant node configurations in a multi-systems-on-a-chip environment. Each system-on-a-chip can include one or processors and memories independent of other systems-on-a-chip and in communication via a cache coherent fabric. To facilitate rapid and extensible reconfiguration, various systems-on-a-chip from the multi-systems-on-a-chip environment can be configured into a redundant node configuration, with each logical node implemented by one or more of the systems-on-a-chip. Each system-on-a-chip within a logical node can be configured to utilize a shared memory space, such as by transparent mirroring of logical memory addresses. Across nodes, systems-on-a-chip can communicate using a device-to-device protocol such as a non-transparent bridge. My reconfiguration of communication between systems-on-a-chip, the multi-systems-on-a-chip environment can be reconfigured to represent a variety of redundant configurations. In one example, a multi-systems-on-a-chip environment can be configured to support safe, resilient operation of an autonomous vehicle.

20 Claims, 21 Drawing Sheets

(56) References Cited

U.S. PATENT DOCUMENTS

2020/0348985 A1   11/2020  O'Bleness et al.
2021/0152282 A1*  5/2021  Huang .................... H04B 7/08
2021/0279055 A1*  9/2021  Saxena .................. G06F 17/16

OTHER PUBLICATIONS

Qi, C. R. et al., "PointNet: Deep Learning on Point Sets for 3D Classification and Segmentation", Cornell University, Apr. 2017, in 19 pages. URL: https://arxiv.org/abs/1612.00593.

International Search Report and Written Opinion received for PCT Patent Application No. PCT/US2023/020040, mailed on Aug. 22, 2023.

U.S. Appl. No. 18/139,857, "Distributed Computing Architecture with Shared Memory for Autonomous Robotic Systems", filed Apr. 26, 2023.

U.S. Appl. No. 18/139,526, "Scalable Configurable Chip Architecture", filed Apr. 26, 2023.

* cited by examiner

SOFTWARE-DEFINED COMPUTE NODES ON MULTI-SoC ARCHITECTURES

BACKGROUND

Autonomous robotic systems, such as autonomous vehicles, rely on a suite of sensors to detect static or dynamic objects in a real-time operating environment. The detection of objects is typically performed by a perception subsystem of the autonomous robotic system that includes a neural network backbone for processing large amounts of two-dimensional (2D) and/or three-dimensional (3D) sensor data in real-time, and classifying and localizing the detected objects in the operating environment. The output of the perception subsystem is used by a planning system of the autonomous robotic system to plan a route through the operating environment. Because of the large amount of sensor data to be processed in real-time, existing distributed computing architectures are not able to meet the desired performance and safety requirements required for certain autonomous robotic systems, such as autonomous vehicles.

DETAILED DESCRIPTION

Figure 1:
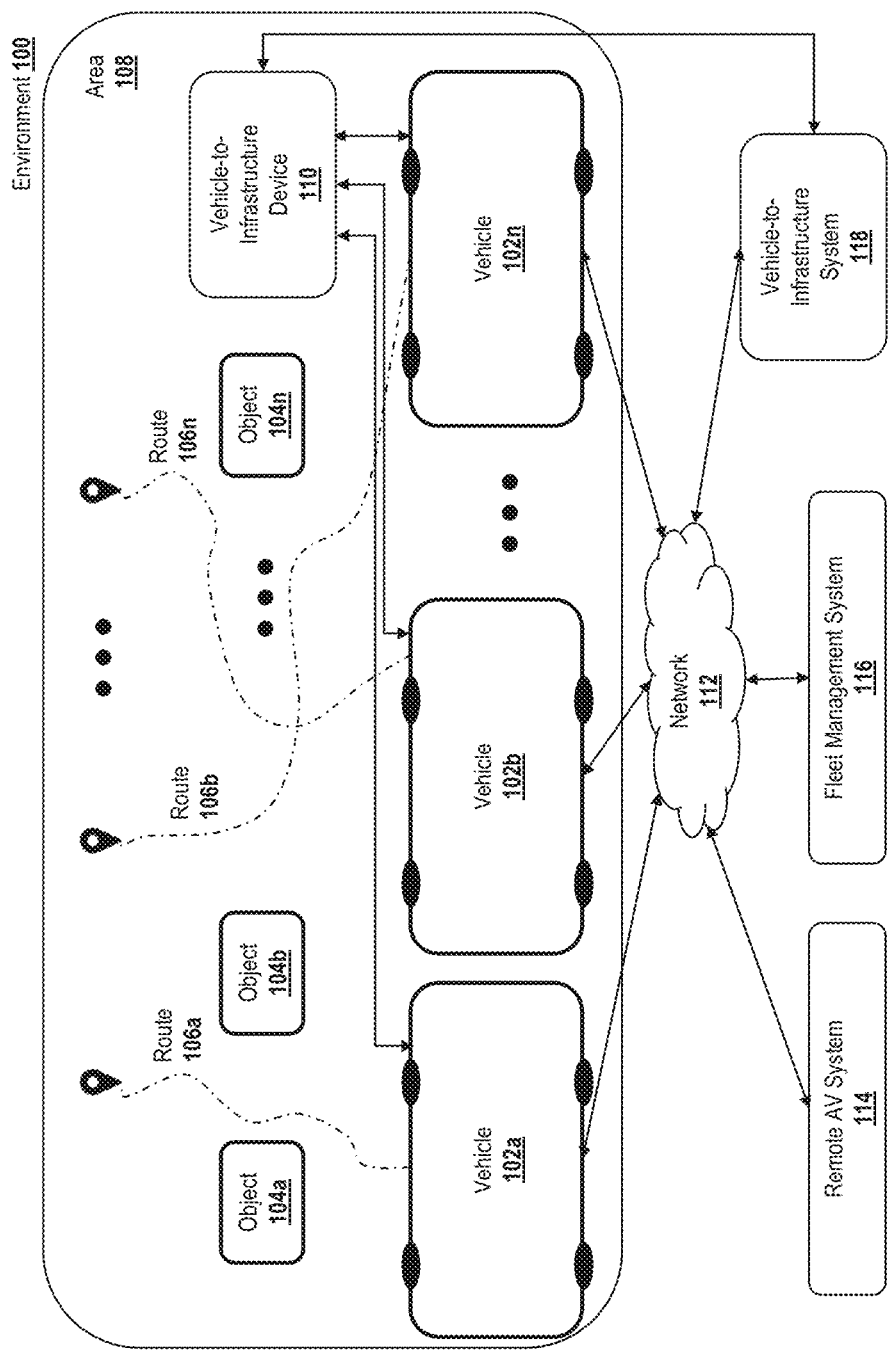
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement technology for a distributed computing architecture for autonomous robotic systems (e.g., such as an autonomous vehicle (AV) compute) with shared memory for task assignment, data communication and reconfiguration.

The disclosed distributed computing architecture includes a plurality of multiprocessor system on chips (MPSoCs) coupled together by a cache coherent fabric. The distributed computing architecture utilizes a software component (for example, middleware) for distributing system resources (e.g., system memory) to the MPSoCs in real-time. In an embodiment, the middleware binds processes or threads (hereinafter "process/thread") to at least one processor core (e.g., an accelerator core(s)) of an MPSoC of the distributed computing architecture. In an embodiment, "leaky" buffers (e.g., lockless ring buffers) located on one or more MPSoCs ensure that processes/threads can operate in real-time in accordance with performance and safety standards for the desired application (e.g., AV compute processes/threads). In an embodiment, system memory is shared between processor cores of MPSoCs using transparent mirroring of logical memory addresses. In an embodiment, a data consumer process/thread in the distributed computing architecture can skip reading one or more buffers of data provided by a data producer process/thread from its own MPSoC through the cache coherent fabric (e.g., buffers with stale data). In an embodiment, only a useful portion of the buffered data (e.g., useful to a specific task in real-time) is selectively fetched/transferred from a buffer to a data consumer process/thread rather than the entire contents of the buffer.

By virtue of the implementation of systems, methods, and computer program products described herein, techniques for implementing a distributed computing architecture with shared memory for task assignment, data communication and reconfiguration provides at least the following advantages. Large amounts of data (e.g., sensor data) can be processed in real-time at high speed to meet strict application requirements in terms of speed and safety, such as implementing various portions of a neural network backbone (e.g., feature extraction, convolutional layers, fully connected layers/prediction heads).

Generally described, aspects of the present disclosure relate to software-defined computing nodes on a multi-system-on-chip (multi-SoC) architecture. More specifically, embodiments of the present disclosure relate to software-implemented division of a multi-SoC architecture into multiple logical computing nodes, each node implemented by one or more SoCs within the multi-SoC architecture. This software-implemented division enables logic reconfiguration of the multi-SoC architecture without requiring physical reconfiguration. This logical reconfiguration, in turn, provides for implementation of a wide variety of redundancy and resiliency architectures that enable the multi-SoC architecture to be applied to safety-critical systems, such as autonomous vehicles.

In safety-critical systems, multiple redundant devices are often used to ensure continued operation of a relevant system, such as an autonomous vehicle. Typically, such redundant devices are physically defined and unchangeable without physical alteration. For example, an autonomous vehicle may include a primary and secondary device, two peer devices, three peer devices, etc., which are physically distinct and hardwired to operate to provide redundant computation in case of failure of a single device. Because these redundancies are physically static, they are difficult to reconfigure, and must often be custom engineered to the application at hand.

In contrast, embodiments of the present disclosure provide for a software-defined computing nodes on a multi-SoC architecture, which may be deployable in a wide variety of situations (e.g., without requiring custom engineering on a per-application basis). As disclosed herein, a multi-SoC architecture can include a plurality of SoCs, such as multi-processor SoCs (MPSoCs), coupled together by a high-speed memory interconnect, such as an interconnect complying with the Universal Chiplet Interconnect Express (UCIe) standard or the Peripheral Component Interconnect Express (PCIe) standard. This interconnect can enable system memory to be shared among the SoCs, thus enabling the SoCs to operate as a single computing device (e.g., running a single operating system, "bare metal" application, etc.). In addition, the interconnect can enable communications between devices according to communication or networking protocols (e.g., Transport Control Protocol/Internet Protocol, or TCP/IP) or other device-to-device protocols. Thus, distinct SoCs may interact as distinct computing nodes (e.g., each running a distinct operating system, bare metal application, etc.).

In accordance with embodiments of the present disclosure, the particular configuration of SoCs into computing nodes may be controlled by middleware software that configures the SoCs during initialization, establishing memory boundaries for SoCs that enable the SoCs to act as a single computing device, or conversely to act as distinct computing devices. For example, a 6 SoC architecture may be divided into 6 distinct nodes of a single SoC each, 3 distinct nodes of 2 SoCs each, 2 nodes of 1 SoC each and 1 node of 4 SoCs, etc. Each computing node may represent a distinct logical computing device, with corresponding distinct physical compute resources provided by associated SoCs. Accordingly, redundancy may be provided by establishing multiple nodes within the multi-SoC architecture. Because each node logically operates as a distinct computing device, and has independent hardware from other computing nodes, these nodes can operate as distinct physical nodes in much the same way as hand engineered redundant SoCs. However, because the nodes are software-defined, they may alternatively be reconfigured such that the same set of SoCs operate as a single node, providing increase computational capacity (e.g., increased parallelism within the logical node). Accordingly, a single multi-SoC architecture may be applicable to a wide variety of uses, and reconfigured via software to provide the appropriate levels of redundancy and parallelism for a given use.

As will be appreciated by one of skill in the art in light of the present disclosure, the embodiments disclosed herein provide for improved operation of a multi-SoC architecture, enabling the architecture to implement a wide variety of computing node configurations, varying the redundancy and parallelism provided by the architecture according to a desired use. This flexibility of redundancy and parallelism, in turn, enables a single multi-SoC architecture to be applied to a variety of use cases, reducing the need for custom physical architectures among those use cases. The embodiments described herein may be of particular use in safety-critical real-time applications, such as autonomous vehicles. Moreover, the presently disclosed embodiments address technical problems inherent within computing systems; specifically, the difficulty of engineering physical architecture to support safety-critical real-time applications with appropriate redundancy and parallelism. These technical problems are addressed by the various technical solutions described herein, including the use of middleware to implement software-defined compute nodes on a multi-SoC architecture. Thus, the present disclosure represents an improvement in computer vision systems and computing systems in general.

The foregoing aspects and many of the attendant advantages of this disclosure will become more readily appreciated as the same become better understood by reference to the following description, when taken in conjunction with the accompanying drawings.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
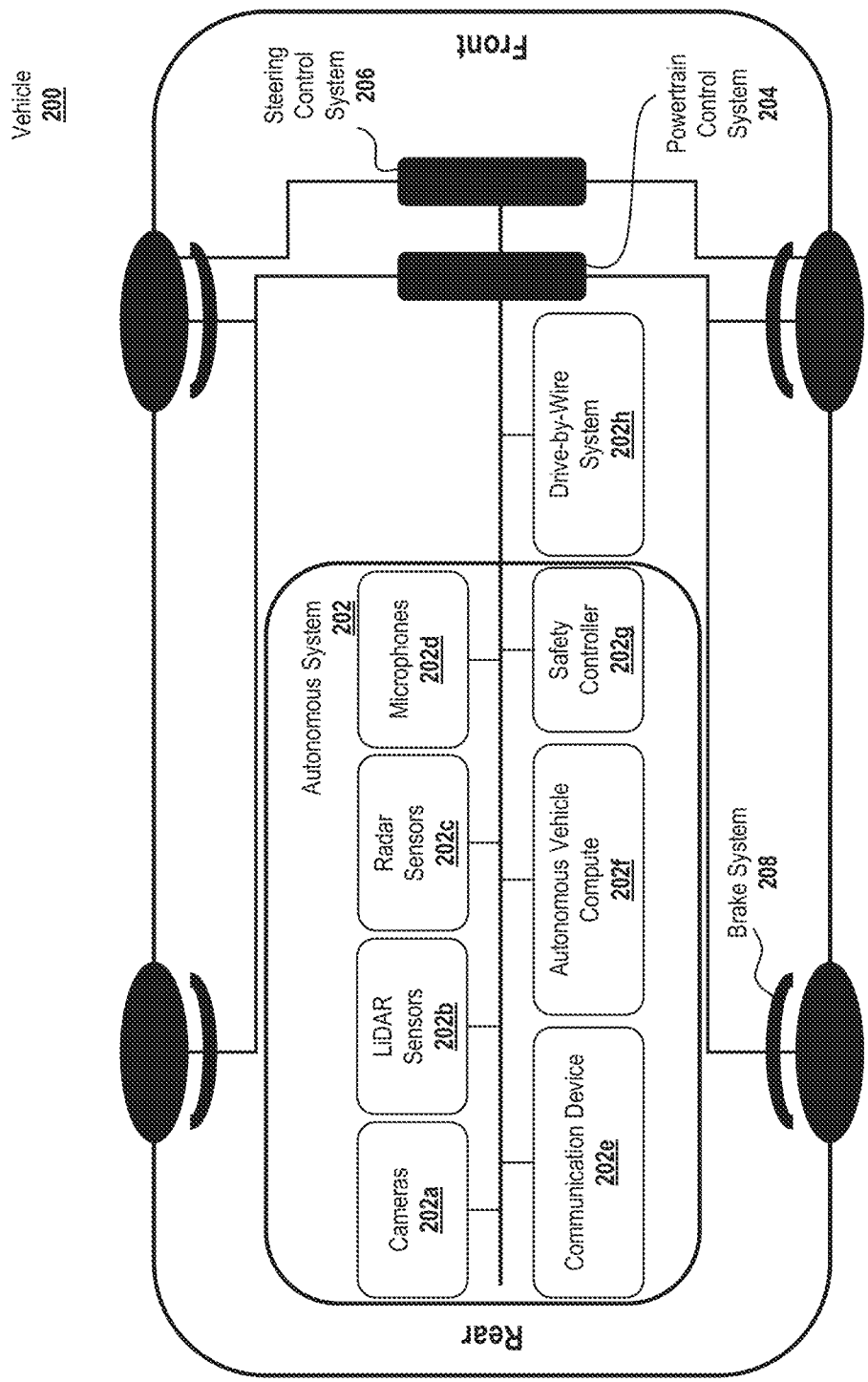
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
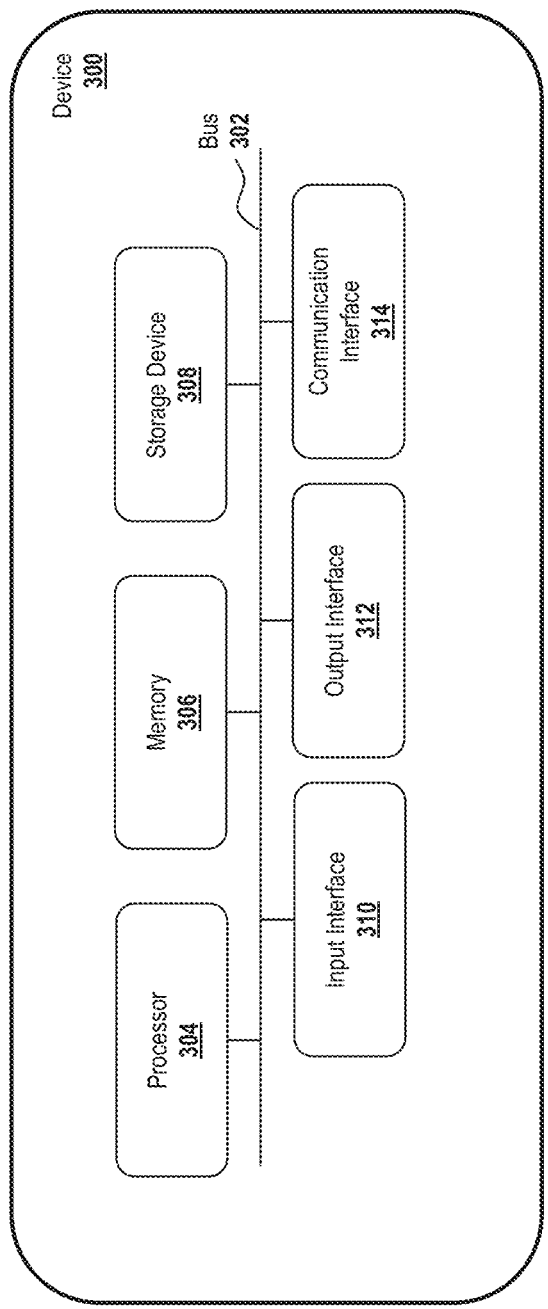
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is configured to implement autonomous vehicle software 400, described herein. In an embodiment, autonomous vehicle compute 202f is the same or similar to distributed computing architecture 500, described here. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102) and/or one or more devices of network 112 (e.g., one or more devices of a system of network 112). In some embodiments, one or more devices of vehicles 102 (e.g., one or more devices of a system of vehicles 102) and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), neural processing unit (NPUs), and/or the like), a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), dynamic RAM (DRAM) and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Referring now to FIG. 4, illustrated is an example block diagram of an autonomous vehicle software 400 (sometimes referred to as an "AV stack"). As illustrated, autonomous vehicle software 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle software 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle software 400 are implemented in software (e.g., in software instructions stored in memory) by computer hardware (e.g., by microprocessors, microcontrollers, application-specific integrated circuits (ASICs), Field Programmable Gate Arrays (FPGAs), and/or the like), chiplets, or distributed computing architectures. It will also be understood that, in some embodiments, autonomous vehicle software 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle software 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
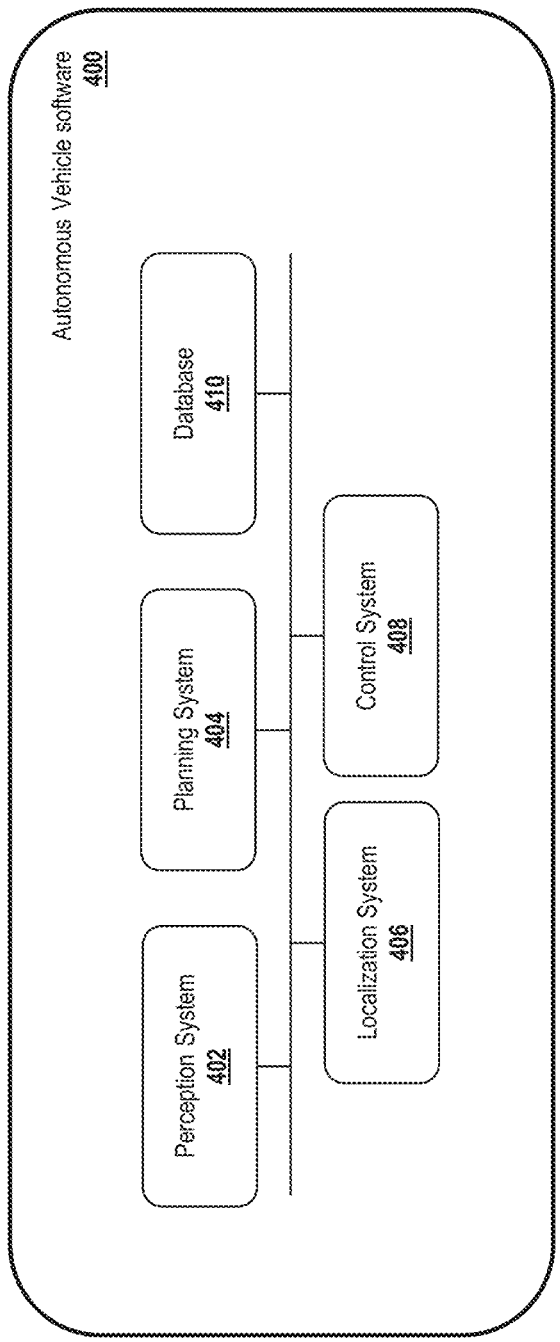
FIG. 4A is a diagram of certain components of an autonomous system.
Figure 4B:
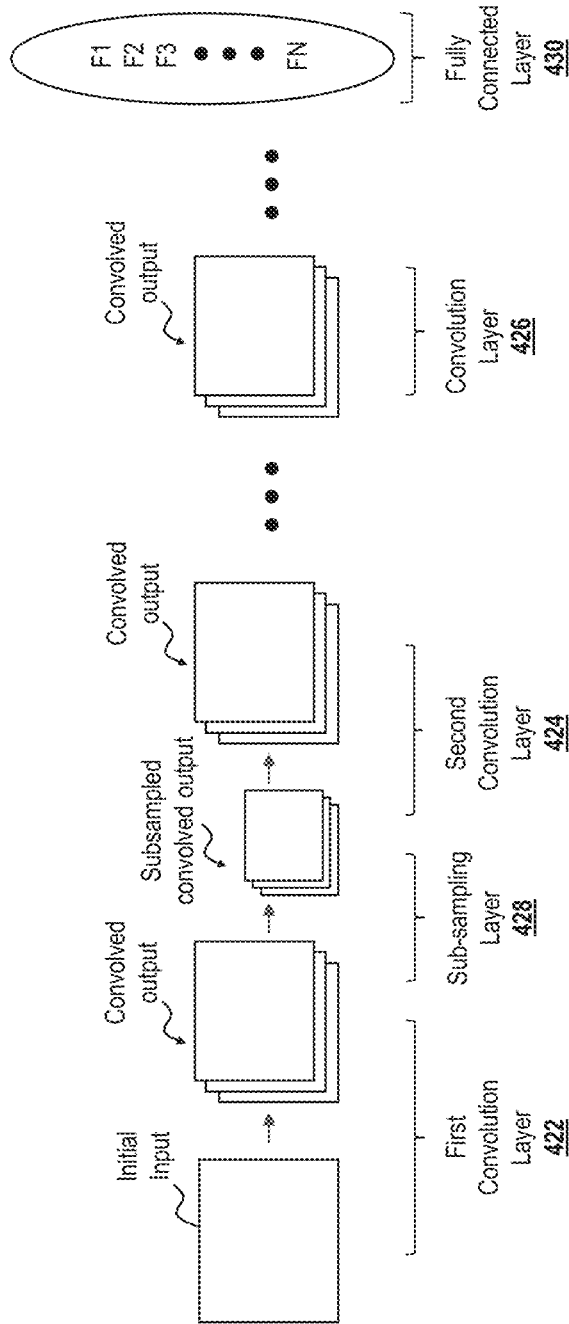
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 ... FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, ... FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
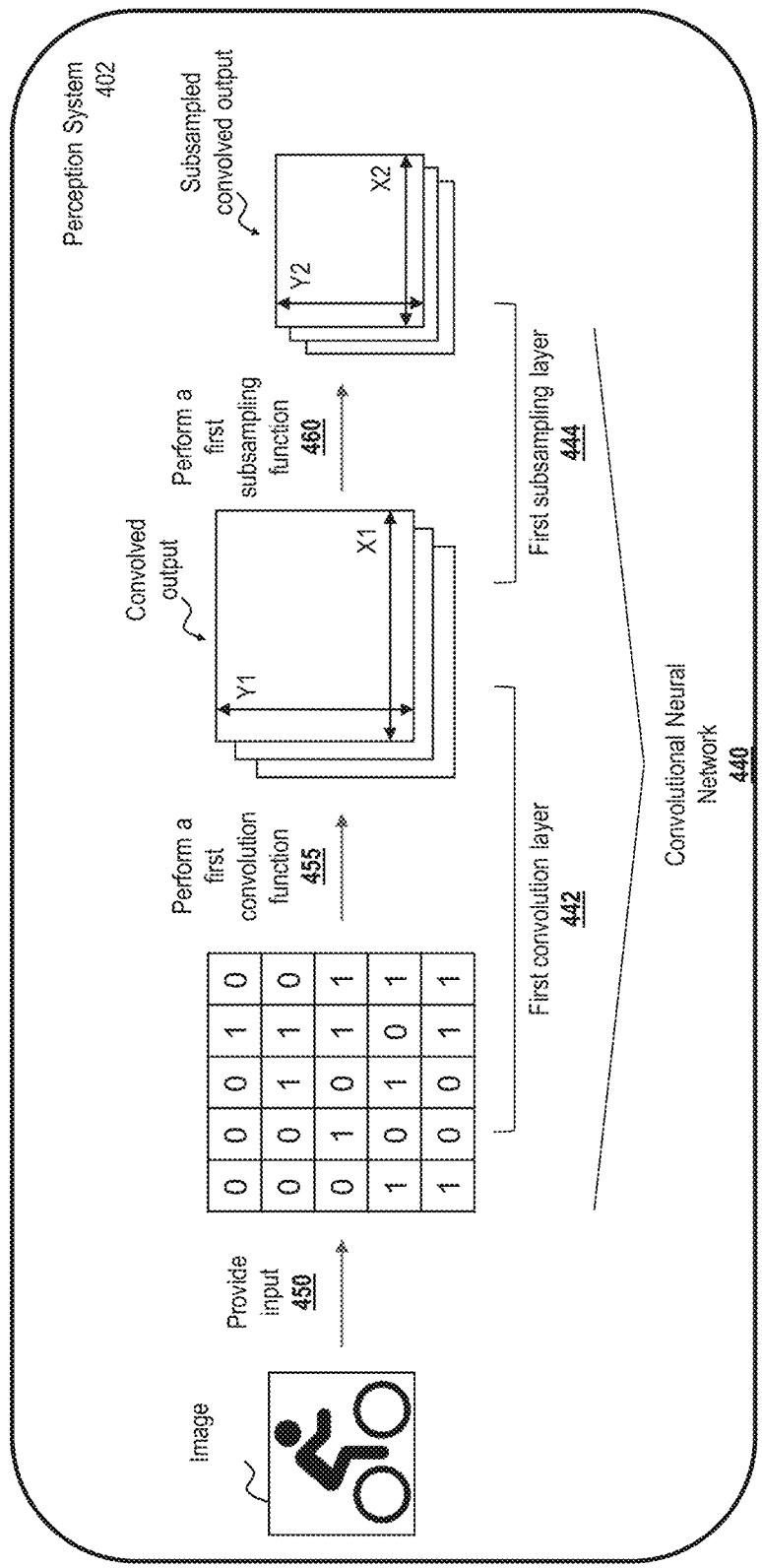
FIGS. 4C and 4D are a diagram illustrating example operation of a CNN.
Figure 4D:
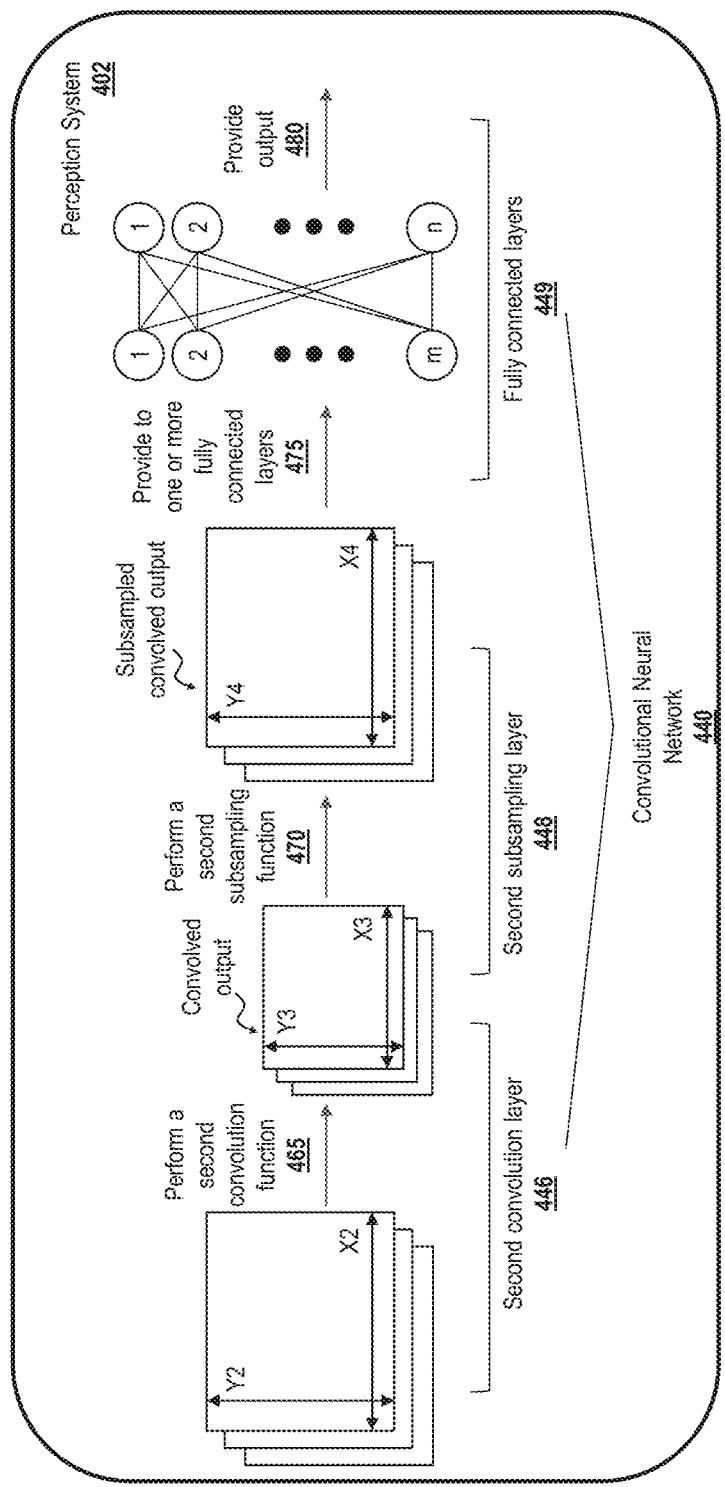

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Example Distributed Computing Architecture

Figure 5:
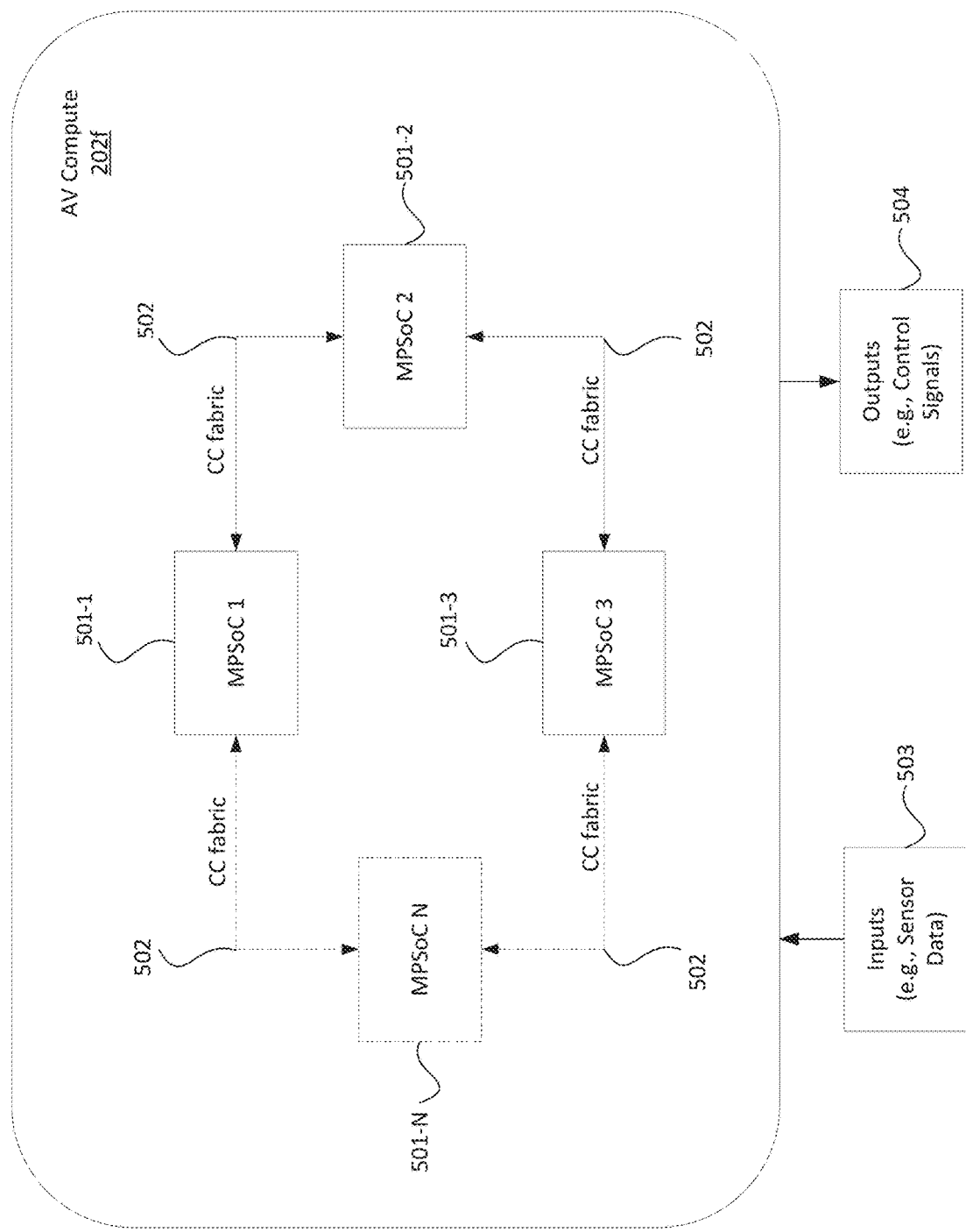
FIG. 5 is an example distributed computing architecture for autonomous robotic systems, according to an embodiment.

FIG. 5 is an example distributed computing architecture 500 for autonomous robotic systems, according to an embodiment. Distributed computing architecture 500 is a heterogeneous or homogeneous system that can be used for machine learning (ML) related software components, such as a neural network, for example convolutional neural networks, or a deep learning network or "backbone" (e.g., ResNet, AlexNet, VGGNet, Inception), and/or prediction head(s) for various tasks. In the example shown, distributed computing architecture 500 includes N chiplets or MPSoCs 501-1 to 501-N interconnected by a cache coherent fabric 502, where N is a positive integer greater than one. Distributed computing architecture 500 receives one or more inputs 503 (e.g., sensor data from cameras, LiDAR, RADAR, V2X data, etc.) and provides one or more outputs 504 (e.g., control signals for controlling an autonomous robotic system)

In some embodiments, distributed computing architecture 500 runs (e.g., completely, partially, and/or the like) one or more processes and/or threads for at least one of systems 402, 404, 406 and 408 of AV software 400. In some embodiments, distributed computing architecture 500 runs (e.g., completely, partially, and/or the like) one or more processes and/or threads another device or system, or another group of devices and/or systems that are separate from, or include, AV software 400. For example, distributed computing architecture 500 can be used to run (e.g., completely, partially, and/or the like) one or more processes and/or threads of remote AV system 114, vehicle 200 (e.g., autonomous system 202 of vehicle 200), in addition to one or more systems of AV software 400. In some embodiments, processes/threads may be pinned to one or more cores of one of MPSoCs of any of the above-noted systems in cooperation with one another. Distributed computing architecture 500 can also be used to run (e.g., completely, partially, and/or the like) one or more processes and/or threads for any of the tasks or computations described in reference to FIGS. 4B-4D.

In an embodiment, MPSoCs 501-1 to 501-N include multiple processor cores, optional functional units, memory blocks, timing sources to generate clock signals to control execution of SoC functions (e.g., crystal oscillators, phase-locked loops), peripherals (e.g., counters, power-on reset generators), external interfaces for communication protocols (e.g., Ethernet, USART, SPI, I$^2$C) and an interconnect, such as a network on chip (NoC) interconnect to communicate and share data between the processor cores, optional function units and other components of the MPSoC. Processor cores can include but are not limited to: M-core Intel®, AMD®, ARM® central processing units (CPUs), Graphic Processing Units (GPUs), Neural Processing Units (NPUs), FPGAs, ASICS, chiplets comprising one or more of the previously mentioned hardware, and the like. In an embodiment, M-core CPUs can be clustered in a single package. For example, multiple quad-core or deca-core CPUs can be combined in a MPSoC to achieve the desired core count for the desired application.

In an embodiment, one or more of MPSoCs 501-1 to 501-N include on-chip cache memory that can be shared with one or more processor cores on the MPSoC using an interconnect (e.g., CCIX, CXL, silicon interposer, NoC) or processor cores on another MPSoC through cache coherent fabric 502, as described more fully in reference to FIGS. 7-12. In another embodiment, distributed computing architecture 500 includes one or more separate memory chips/controllers that are shared by two or more MPSoCs through cache coherent fabric 502.

Figure 6:
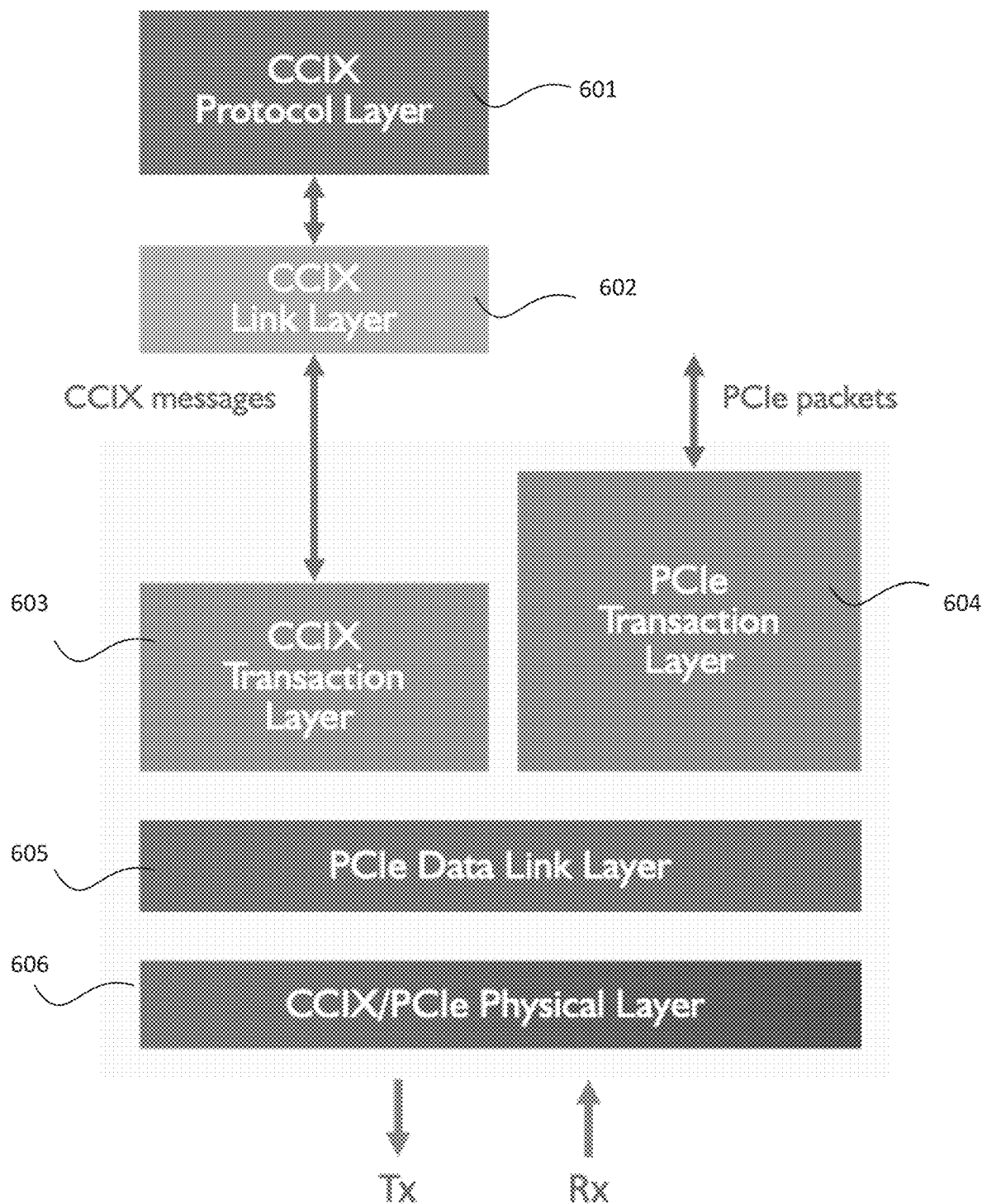
FIG. 6 illustrates a CCIX software stack, according to an embodiment.

An example of cache coherent fabric 502 is Cache Coherent Interconnect for Accelerators (CCIX) described in reference to FIG. 6. CCIX is a chip-to-chip interconnect that enables two or more devices to share data in a cache coherent manner. For AV compute tasks, accelerators (e.g., GPUs, FPGAs, Smart Network Interface Cards (Smart NICs), etc.) can complete needed functionality faster and with lower power consumption than a single central processing unit (CPU). CCIX allows for optimizing and simplifying heterogeneous systems while at the same time increasing bandwidth and reducing latency in systems built with devices processing via processors with different instruction set architectures (ISAs) or application specific accelerators.

Example Cache Coherent Fabric

Referring to FIG. 6, CCIX is a layer-based architecture that expands on the base PCI Express® architecture. CCIX includes protocol layer 601, link layer 602, CCIX transaction layer 603, PCIe transaction layer 604, PCIe data link layer 605 and CCIX/PCIe physical layer 606.

Protocol layer 601 is responsible for the coherency protocol, including memory read and write flows. Layer 601 provides mapping for on-chip coherency protocols such as Arm® AMBA CHI. The cache states defined in layer 601 allow hardware to determine the state of memory (e.g., determine if data is unique and clean or if it is shared and dirty).

Link layer 602 is responsible for formatting traffic (e.g., CCIX traffic) for a target transport. In addition, layer 602 manages port aggregation, allowing multiple ports to be aggregated together to increase bandwidth.

Transaction layers 603, 604 are responsible for handling their respective packets. The PCIe protocol allows for the implementation of Virtual Channels allowing different data streams to travel across a single PCIe link. By splitting first traffic (e.g., CCIX traffic) into one Virtual Channel and second traffic (e.g., PCIe traffic) into a second Virtual Channel, both first and second traffic can share the same link.

Data link layer 605 performs all of the normal functions of a data link layer, including but not limited to: Cyclic Redundancy Code (CRC) error checking, packet acknowledgment and timeout checking, and credit initialization and exchange.

Physical layer 606 is a PCIe physical layer that extends the physical layer to support PCIe link speeds, and provide backward support for various PCIe speeds plus extended speeds.

In other embodiments, other cache coherent fabrics can be used in distributed computing architecture 500, such as Compute Express Link (CXL) which is an open standard for high-speed central processing unit (CPU)-to-device and CPU-to-memory connections.

Figure 7:
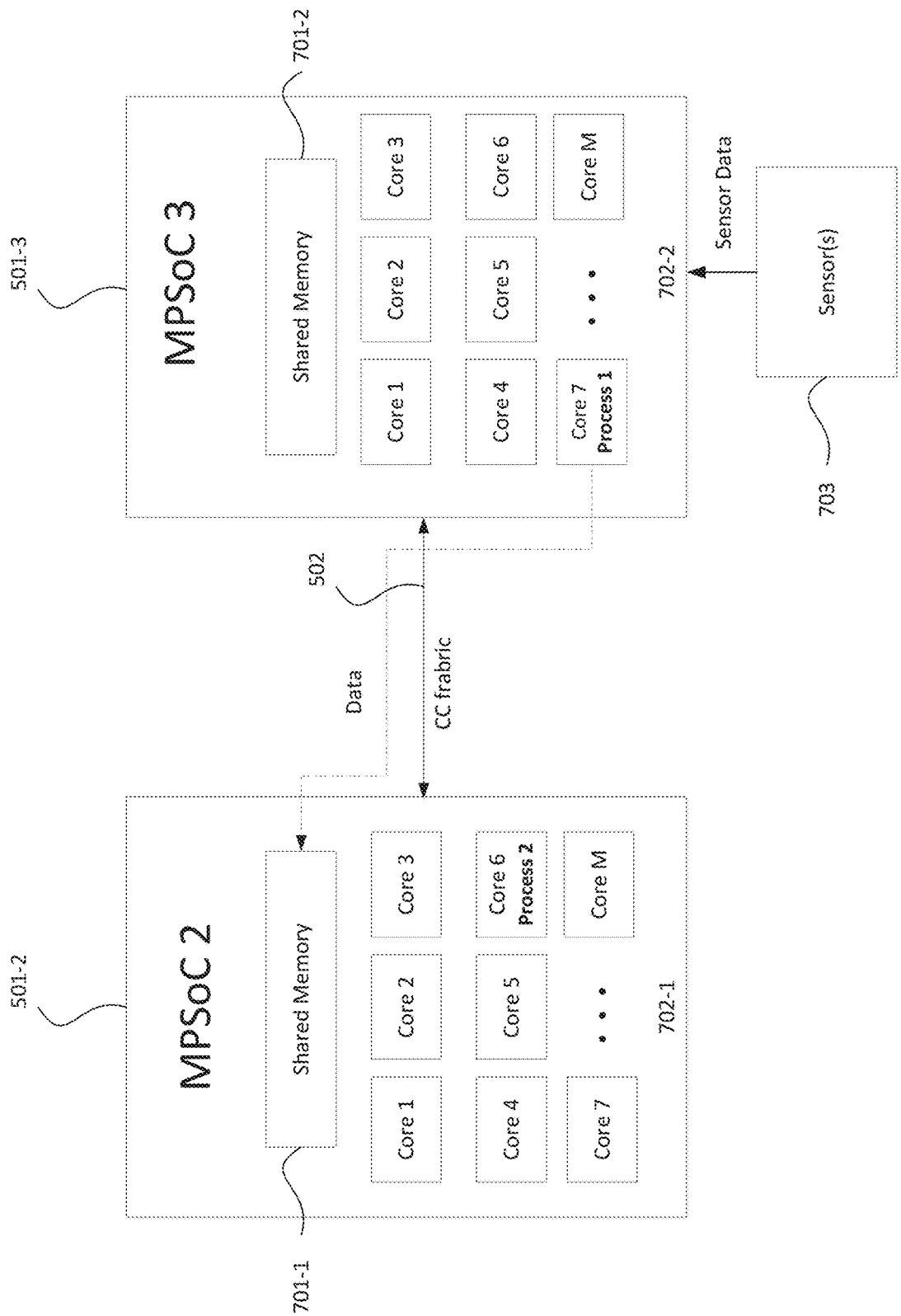
FIG. 7 illustrates binding processes to specific cores on specific MPSoCs in the distributed computing architecture shown in FIG. 5, according to an embodiment.

FIG. 7 illustrates pinning (also called "binding") processes to specific processor cores on specific MPSoCs in the distributed computing architecture 500 shown in FIG. 5, according to an embodiment. In the example shown, process 1 is pinned to core 7 of MPSoC 501-3 (MPSoC 3) and process 2 is pinned to core 6 of MPSoC 501-2 (MPSoC 2). Data generated by process 1 can be stored in on-chip cache memory 701-1 (e.g., shared memory) of MPSoC 501-2, and fetched by process 2 to be used in process 2 to perform a task. For example, in an AV compute application, process 1 can be detecting objects in 2D (e.g., video data) and/or 3D sensor data (e.g., LiDAR point cloud), and process 2 can be fetching object detection data output by process 1 from cache memory 701-1, and using the object detection data to plan a route for the AV or to perform a motion control task (e.g., DBW).

In an embodiment, distributed computing architecture 500 uses one or more processor cores from multiple MPSoCs to implement one or more portions of a deep learning backbone. For example, at least one core of a first MPSoC can implement data embedding/encoding functions of a neural network, at least one processor core of a second MPSoC can implement a feature extraction layer of the neural network, at least one processor core of a third MPSoC can implement upscaling/downscaling of feature vectors, at least one processor core of a fourth MPSoC can implement a pooling layer, at least one processor core of a fifth MPSoC can implement a fully connected network or prediction head, etc. An example operation implemented by at least one processor core can be, for example, multiply-and-accumulate (MAC) operations often used in machine learning algorithms. In addition to dividing up deep learning tasks among multiple MPSoCs in distributed computing architecture 500, deep learning tasks can be divided between processor cores on the same MPSoC.

Shared memory access operations can be implemented by one or more memory controllers integrated on one or more MPSoCs or one or more separate memory controllers can be included as separate chiplets in distributed computing architecture 500. Access operations to/from buffers of the MPSoCs to a shared memory location included in the MPSoCs or a separate memory can be implemented using cache coherent fabric 502, on-chip NoCs and a multithreading programming model (e.g., Open Multiprocessing (OpenMP), Open Asymmetric Multi-Processing (OpenAMP), Message Passing Interface (MPI)) or a multiprocess multidevice programming model (e.g., Open Augmentative and Alternative Communication (OpenAAC)). In an embodiment, a Partitioned Global Address Space (PGAS) programming model is used by distributed computing architecture 500, which scales across cores and clusters of MPSoCs while preserving a shared memory-like programming mode. In an embodiment, a Compute Unified Device Architecture (CUDA) is used to facilitate computing on GPUs in distributed computing architecture 500.

Figure 8:
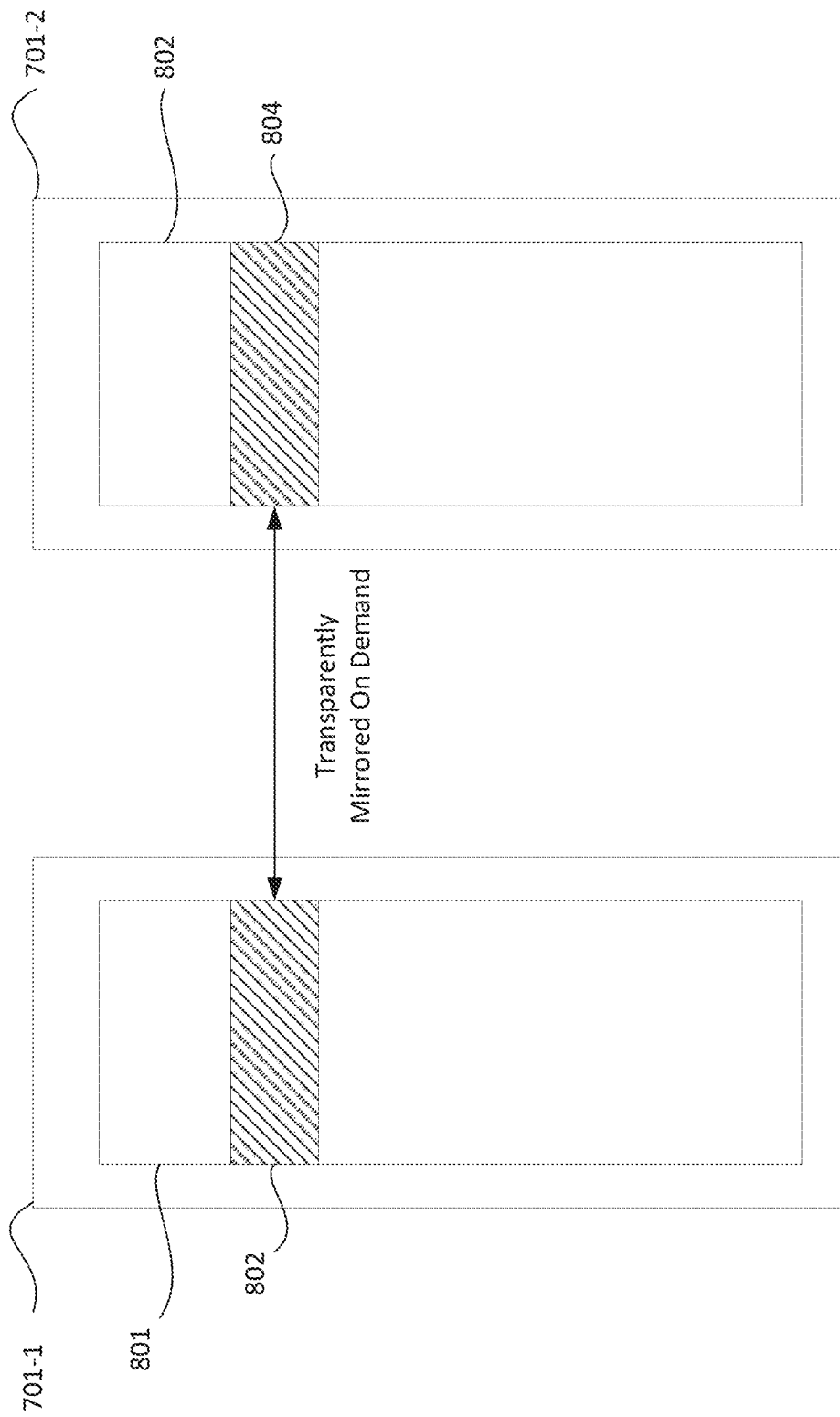
FIG. 8 illustrates shared memory among two MPSoCs in the distributed computing architecture shown in FIG. 5, according to an embodiment.

FIG. 8 illustrates shared memory among MPSoCs in the distributed computing architecture 500 shown in FIG. 5, according to an embodiment. In the example shown, cache memory 701-1 in MPSoC 2 includes logical address space 801 (local memory space) for Process 2 and cache memory 701-2 in MPSoC 3 includes logical address space 802 (local memory space) for Process 1. A portion 803 of logical address space 801 is transparently mirrored on demand to a portion 804 of logical address space 802, resulting in a shared memory space for Process 1 and Process 2 to store and fetch data needed for their respective tasks. In an embodiment, a non-uniform memory access (NUMA) architecture and a multithreading programming model (e.g., OpenMP threads, POSIX threads, Intel Threading Building Blocks, Cilk Plus threads) is used to implement shared memory.

Figure 9:
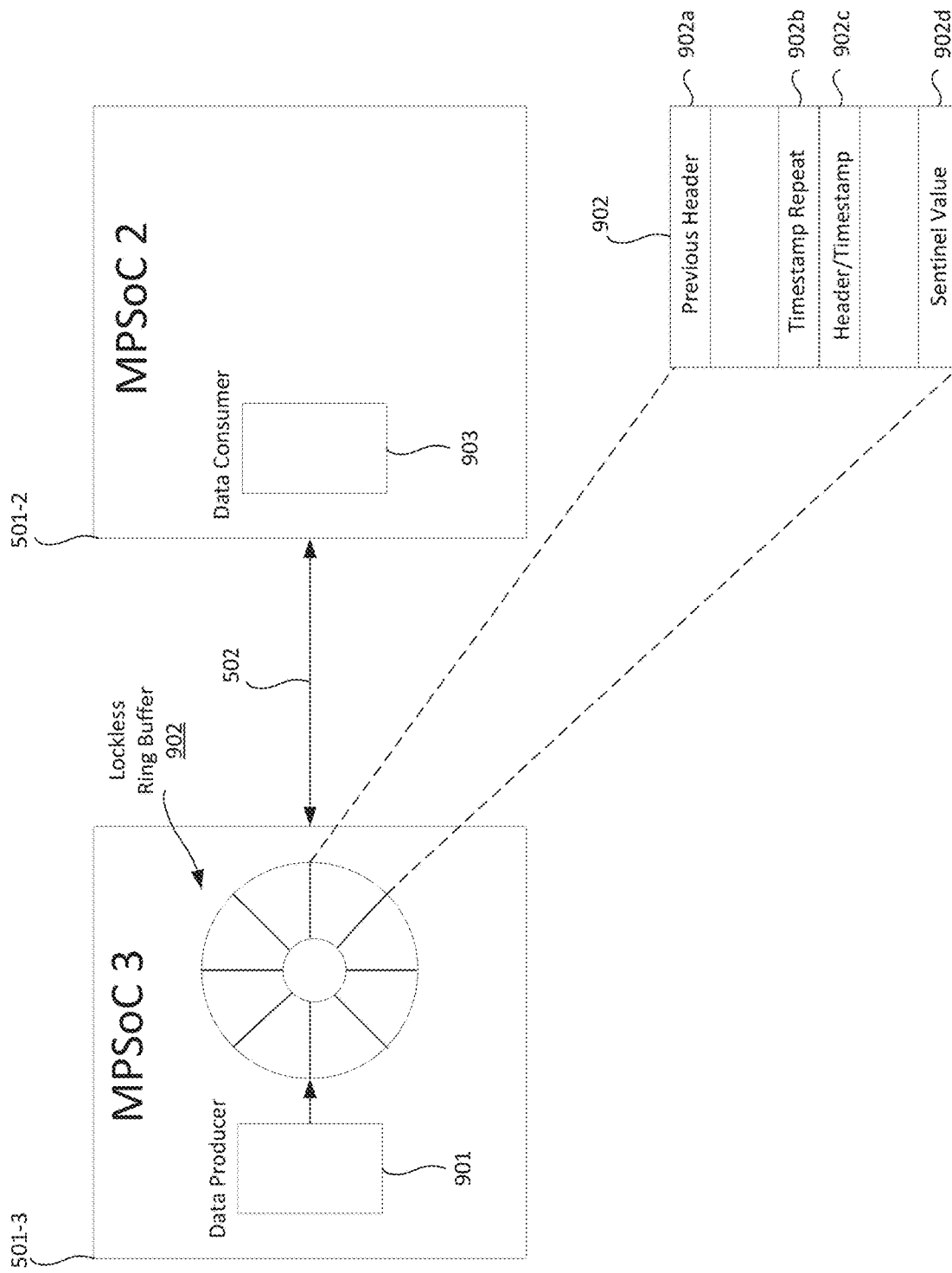
FIG. 9 illustrates "leakiness" in the distributed computing architecture shown in FIG. 5, according to an embodiment.
Figure 10:
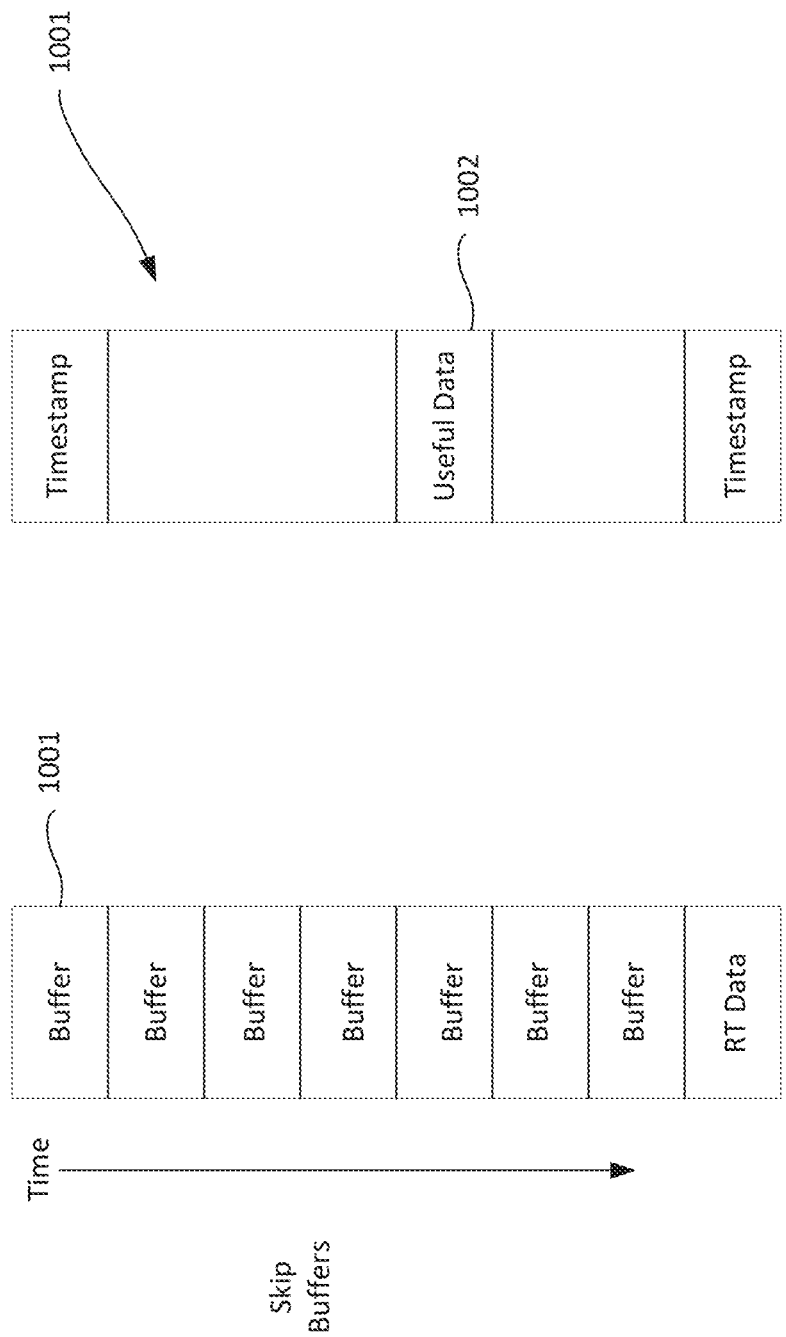
FIG. 10A illustrates a process of skipping buffers through a cache coherent fabric, according to an embodiment.
FIG. 10B illustrates a process of selecting useful data from within a buffer, according to an embodiment.

FIG. 9 illustrates "leakiness" in the distributed computing architecture 500 shown in FIG. 5, according to an embodiment. With "leakiness" one or more processes running on distributed computing architecture 500 drops data if a data consumer (e.g., data consumer 903) needs to "catch-up" with real-time. In an embodiment, ring buffer 902 (e.g., a lockless ring buffer) coupled data producer 901 on an MPSoC is used to drop data output from its local memory. Ring buffer 902, also called a circular buffer, is a type of queue with a fixed maximum allowed size that continually reuses an allocated memory space to store data.

A blowup view of ring buffer 902 is also shown if FIG. 9, where each data packet stored in the buffer includes header 902a, timestamp 902b, and sentinel value 902d (e.g., a value whose presence indicates the end of a data packet in the buffer). The use of a "lockless" or "lock free" ring buffer means slow or stopped processes do not prevent other processes from accessing data from ring buffer 902.

FIG. 10A illustrates a process of skipping buffers 1001 through a cache coherent fabric, according to an embodiment. In an embodiment, shared memory can be optimized allowing the data consumer 903 to skip buffers 1001 from its own MPSoC through cache coherent fabric 502 and read the final timestamp, real-time data, and sentinel value from the buffer in a lockless manner.

FIG. 10B illustrates a process of selecting useful data from within buffer 1001, according to an embodiment. In an embodiment, shared memory can be optimized by allowing a data producer to selectively transfer a portion of "useful" data 1002 from the buffer contents rather than fetching the entire buffer contents, where "useful" data 1002 is any data in buffer 1001 that is needed by the data consumer 903 to perform any task that uses the data, for example, a task performed in real-time or non-real-time.

Figure 11:
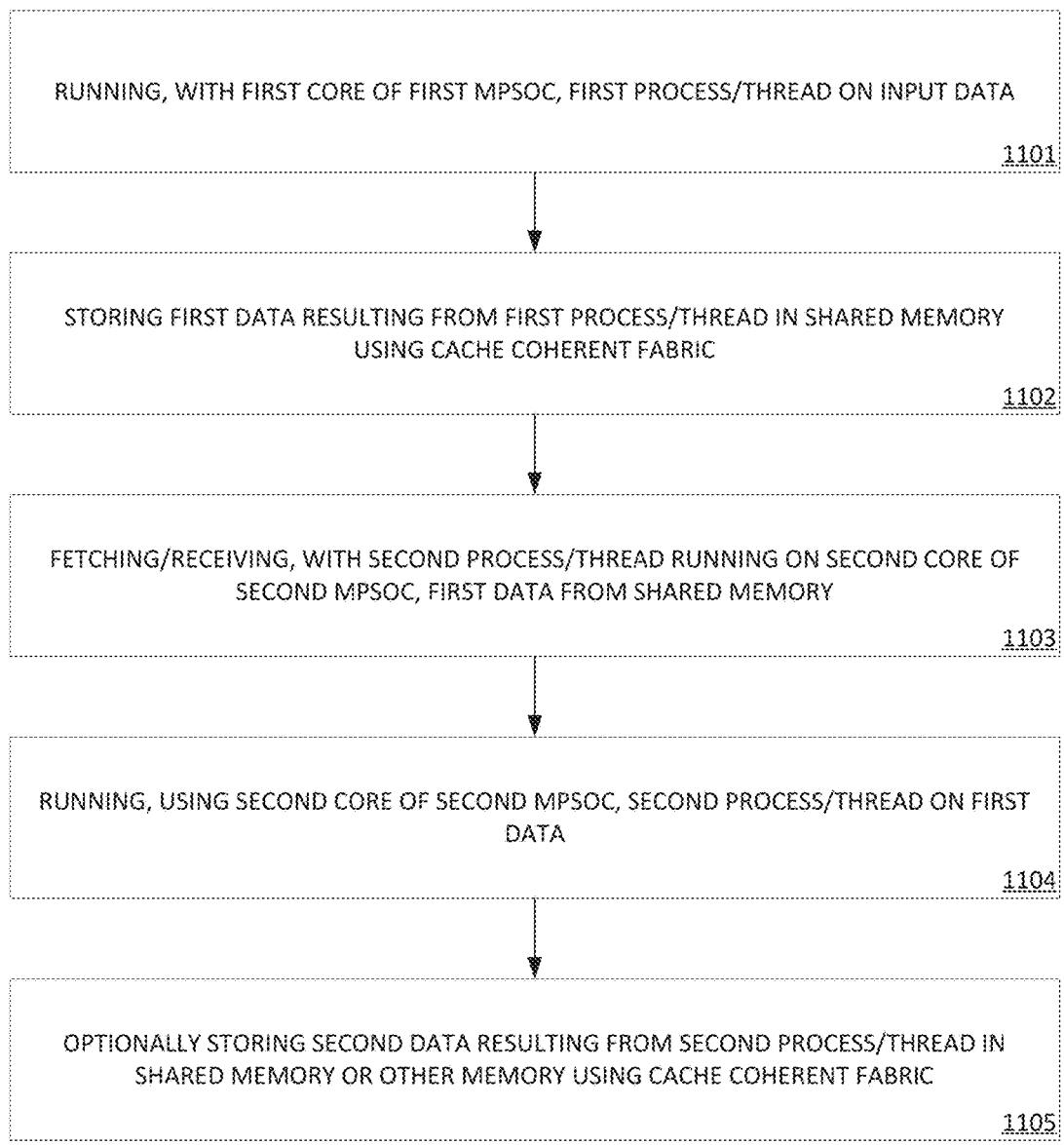
FIG. 11 is a flow diagram of a process of sharing memory between cores of different MPSoCs, according to an embodiment.

FIG. 11 is a flow diagram of a process 1100 of using middleware to share memory between processes pinned to different cores of different MPSoCs in distributed computing architecture 500, according to an embodiment. Process 1100 can be implemented, for example, by distributed computing architecture 500, as described in reference to FIGS. 1-10.

Process 1100 comprises: running a first process/thread, with a first core of a first MPSoC, on input data (1101); storing first data resulting from the first process/thread in shared memory using a cache coherency fabric (1102); fetching/receiving, with a second core of a second MPSoC, the first data from the shared memory (1103); running the second process/thread on the first data (1104); and optionally storing second data generated by the second process/thread in the shared memory (1105).

Example Distribution of AV Perception Tasks to MPSoC Cores

Figure 12:
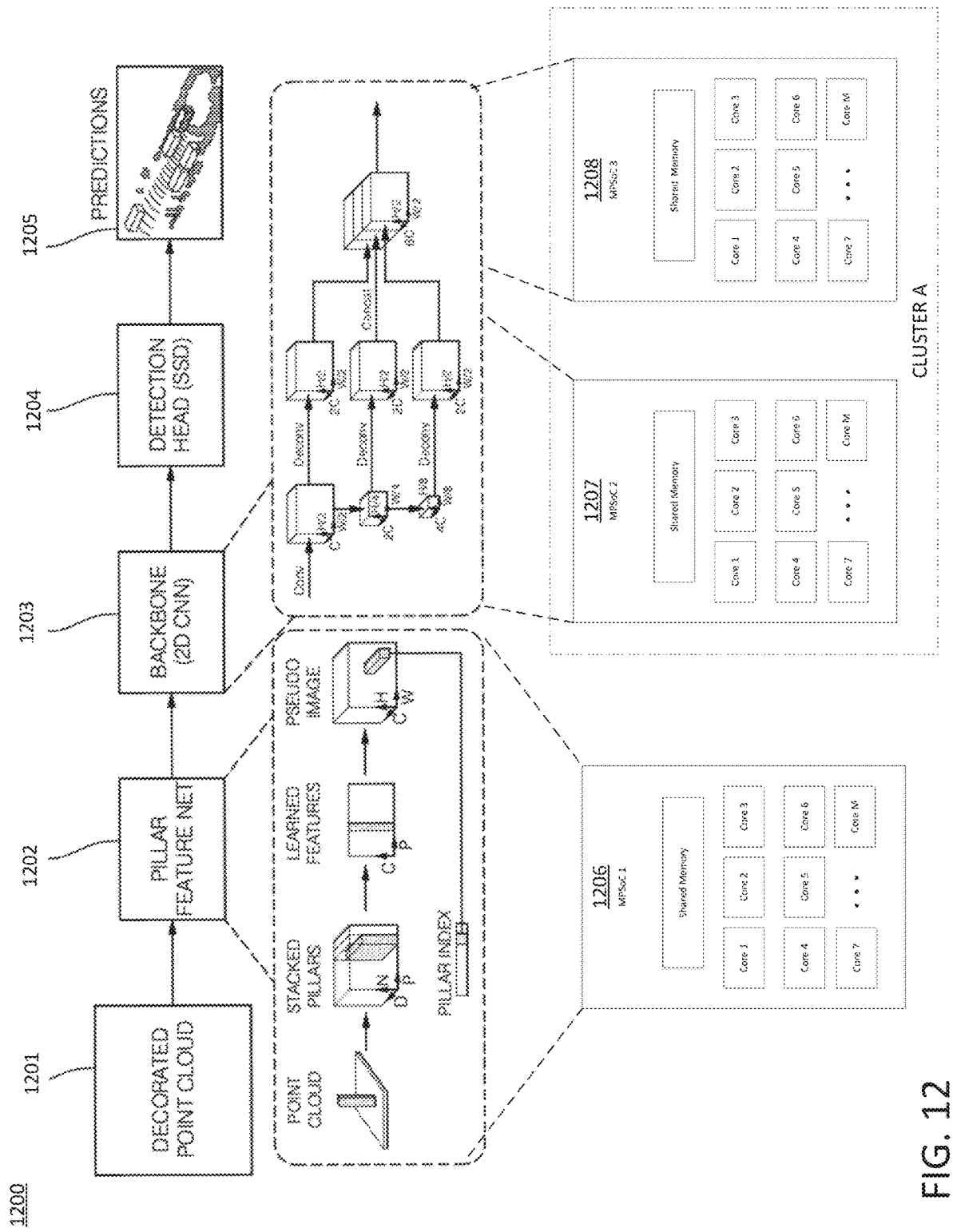
FIG. 12 is a block diagram of an example of distributing AV compute tasks to portions of a deep learning network for a perception pipeline of an AV, in accordance with one or more embodiments.

FIG. 12 is a block diagram of an example of distribution AV compute tasks to portions of a deep learning network 1200 for a perception pipeline of an AV, in accordance with one or more embodiments. Deep learning network 1200 is configured to accept decorated point clouds 1201 (e.g., LiDAR point clouds) as input and estimate/predict oriented 3D bounding boxes 1205 for various classes, including but not limited to cars, pedestrians, and cyclists. Deep learning network 1200 includes three main stages: 1) pillar feature network 1202 (a feature encoder) that converts the point cloud to a sparse pseudo-image (e.g., an 2D image embedding with more than 3 RGB channels); 2) 2D convolutional neural network (CNN) backbone 1203 to process the pseudo-image into a high-level representation; and 3) detection head 1204 that detects and regresses 3D boxes (predictions) 1205.

In an embodiment, pillar feature network 1202 converts the point cloud to a pseudo-image (e.g., a 2D image embedding (tensor) with more than three channels). A point in the point cloud with position coordinates x, y, z, and reflectance r. As a first step the point cloud is discretized into an evenly spaced grid in the x-y plane, creating a set of pillars P. The points in each pillar are then augmented with x_c, y_c, z_c, x_p and y_p, where the c subscript denotes distance to the arithmetic mean of all points in the pillar P and the p subscript denotes the offset from the pillar's x, y center. In this example, the augmented point has 9 dimensions.

In an embodiment, the augmented point is further augmented (fused) with semantic segmentation data output by an image semantic network (ISN) (not shown). The ISN takes as input an image form, for example, a video camera, and predicts a class for each pixel in the image and outputs semantic segmentation data (e.g., a semantic segmentation score) for each pixel in the image. In an embodiment, the ISN is trained using an image dataset that includes images where each image is annotated with 2D bounding boxes and segmentation labels for classes in the image dataset. An example semantic segmentation score is a probability value that indicates the probability that the class of the pixel was correctly predicted. For example, each point can be further augmented with semantic segmentation scores reduced to the classes of, for example, car, bike, pedestrian, and background, resulting in an augmented point that has 13 dimensions.

Next, a simplified version of a PointNet classification network is applied to each augmented point, as described in Qi, Charles R., et al. "PointNet: Deep Learning on Point Sets for 3D Classification and Segmentation." ArXiv.org, 10 Apr. 2017, https://arxiv.org/abs/1612.00593.

For each point, a linear layer is applied followed by Batch-Norm and ReLU to generate a (C, P, N) sized tensor. The linear layer is followed by a max operation over the channels to create an output tensor of size (C, P). Once encoded, the features are scattered back to the original pillar locations to create a pseudo-image of size (C, H, W) where H and W indicate height and width, respectively.

Next, the pseudo-image is input into deep learning backbone 1203. In an embodiment, backbone 1203 has two sub-networks: one top-down network that produces features at increasingly small spatial resolution and a second network that performs upsampling and concatenation of the top-down features. The top-down backbone can be characterized by a series of blocks Block (S, L, F). Each block operates at stride S (measured relative to the original input pseudo-image). In the example shown, a block has L 3×3 2D convolution layers with F output channels, each followed by BatchNorm and a ReLU. The first convolution inside the layer has stride $s/s_{in}$ to ensure the block operates on stride S after receiving an input blob of stride $S_{in}$. All subsequent convolutions in a block have stride 1.

The final features from each top-down block are combined through upsampling and concatenation as follows. First, the features are upsampled, up (Sin, Sout, F) from an initial stride $S_{in}$ to a final stride $S_{out}$ (both again measured with respect to the original pseudo-image) using a transposed 2D convolution with F final features. Next, BatchNorm and ReLU is applied to the upsampled features. The final output features are a concatenation of all features that originated from different strides.

In an embodiment, detection (prediction) head 1204 is implemented using a single shot detector setup to perform 3D object detection. Similar to SSD, the prior boxes are matched to a ground truth using 2D Intersection over Union (IoU).

Each of the tasks performed by deep learning network 1200 described above can be pinned to at least one processor core of at least one MPSoC of distributed computing architecture 500, as shown in FIG. 12. For example, MPSoC 1206 can be responsible for tasks of the pillar feature network 1202. The distribution of tasks shown in FIG. 12 is only one example distribution. In practice, processes/threads are distributed among processor cores/MPSoCs in a manner that facilitates fast, real-time processing of large amounts of data while complying with any performance and/or safety requirements for the particular application.

For example, processes/threads that run in parallel may be distributed to different cores within a single MPSoC or between two or more MPSoCs in the distributed computing architecture 500. In another example, processes/threads that share data can be distributed to processor cores on the same MPSoC and utilize shared memory on that MPSoC, another MPSoC and/or off-chip memory through cache coherent fabric 502.

In another example, two or more MPSoCs can be assigned to a "cluster" to perform a specific AV compute task. In FIG. 12, for example, Cluster A includes MPSoC 1207 and MPSoC 1208 which are responsible for handling backbone

1203 tasks. In an embodiment, detection head 1204 tasks can be handled by Cluster A or another MPSoC or cluster of MPSoCs.

In an embodiment, one or more clusters can be used to handle various tasks of AV software 400 including but not limited to tasks performed for localization system 406, planning system 404, perception system 402 and control system 408, as shown in FIG. 4. For example, a first cluster of MPSoCs can implement one or more processes/threads for localization system 406, a second cluster of MPSoCs can implement one or more processes/threads for planning system 404, a third cluster of MPSoCs can implement one or more processes/threads for perception system 402 (e.g., object detection, classification and localization) and a fourth cluster of MPSoCs can implement control system 408 tasks (e.g., implement model predictive control (MPC) tasks, DBW tasks).

Within a particular cluster of MPSoCs, tasks can be further distributed. For example, a cluster that implements perception pipeline tasks may include a first MPSoC for object detection and classification, a second MPSoC for object localization, a third MPSoC for determining 2D or 3D bounding boxes, a fourth MPSoC for ground plane estimation, a fifth MPSoC for fusing 2D and 3D processing pipelines, and so forth.

Within each MPSoC, processor cores can be used to implement repetitive mathematical operations, such as MAC operations, vector and matrix operations, scaling operations, convolution, masking operations, coordinate transformations, time/frequency transformations, control laws, state estimators (e.g., Kalman filter prediction/correction steps) and other predictors, state machines, communication protocols, security operations, safety operations, health monitoring, log generation, teleoperation tasks, etc.

In an embodiment, machine learning tasks can be distributed to multiple MPSoCs that each include multiple NPUs. The NPUs can be used for training, inference or both training and inference. In an embodiment, NPUs perform both training and inference independently.

Open-Scale scalability can be achieved in distributed computing architecture 500 by replicating as many NPUs as required in each MPSoC. An example NPU architecture includes the following components: a CPU, separate cache memories (e.g., L1 cache) for instructions and data, respectively, an interrupt controller, a timer, a communication interface for debugging purposes (e.g., a UART), embedded memory (e.g., RAM), a network interface (e.g., a NoC interface for packet switching), a router (e.g., an XY router that allows deterministic routing) and a local bus (e.g., an OpenCores Wishbone bus).

In an embodiment, the NPU architecture includes a direct memory access (DMA) capability that includes a read engine having a read buffer and a write engine having a write buffer and a controller configured to use DMA to perform hardware pre-processing of data in the read buffer and post-processing of data in the write buffer on blocks or other data units of a data (e.g., data stripes) to, for example, process tensors (e.g., image of arbitrary number of channels) in neural networks.

To implement a distributed memory structure and to preserve the scalability of the MPSoC, each NPU can operate asynchronously and use, for example, an MPI Application Programming Interface (API) for message passing communication and to allow global decisions to be performed in a distributed manner without using global shared-memory.

In an embodiment, each NPU runs an open-scale, real-time operating system (RTOS) that performs basic RTOS services (e.g. function calls), communication services and utilizes drivers and libraries. In an embodiment, the RTOS provides multi-threaded preemptive execution using a scheduler (e.g., round robin scheduler) based on thread priorities that is executed periodically according to, for example, a fixed timeslot. In an embodiment, the RTOS kernel can include an MPI API, an exception manager, a memory manager, a task manager, a scheduler, an interrupt manager (e.g., for managing hardware interrupts), a runtime task loader (e.g., for migrating running tasks between NPUs to enable dynamic load balancing), a routing table, etc. Application tasks can communicate with the RTOS through the MPI API. Memory management can be implemented using paging, dynamic memory allocation/deallocation or any other suitable memory management process.

In an embodiment, the NPUs accelerate training task by, for example, creating new machine learning models, including but not limited to inputting training datasets (e.g., a labeled datasets) and iterating over the datasets, adjusting model weights and biases to ensure an accurate model, correcting inaccurate predictions by propagating back through the layers of the network and estimating a correction to weights in the layers until a desired accuracy is achieved.

In an embodiment, the NPUs accelerate inference operations on complete models. For example, the NPU can input new sensor data (e.g., a new camera frame), and accelerate its processing through the trained machine learning model and generate a result.

In an embodiment, one or more clusters of MPSoCs can be used to provide redundancy for various critical AV tasks to ensure continued operation in the event of a system or subsystem failure.

In an embodiment, one or more clusters of MPSoCs are assigned to different sections or zones of an AV. For example, a first cluster can be assigned to front-right facing sensors, a second cluster can be assigned to front-left facing sensors, a third cluster can be assigned to right side facing sensors, a fourth cluster can be assigned to left side facing sensors and a fifth cluster can be assigned to rear-facing sensors. In an embodiment, one or more clusters can be assigned to handle safety maneuver tasks, processing occupancy grids, processing V2X communications, etc.

Figure 13:
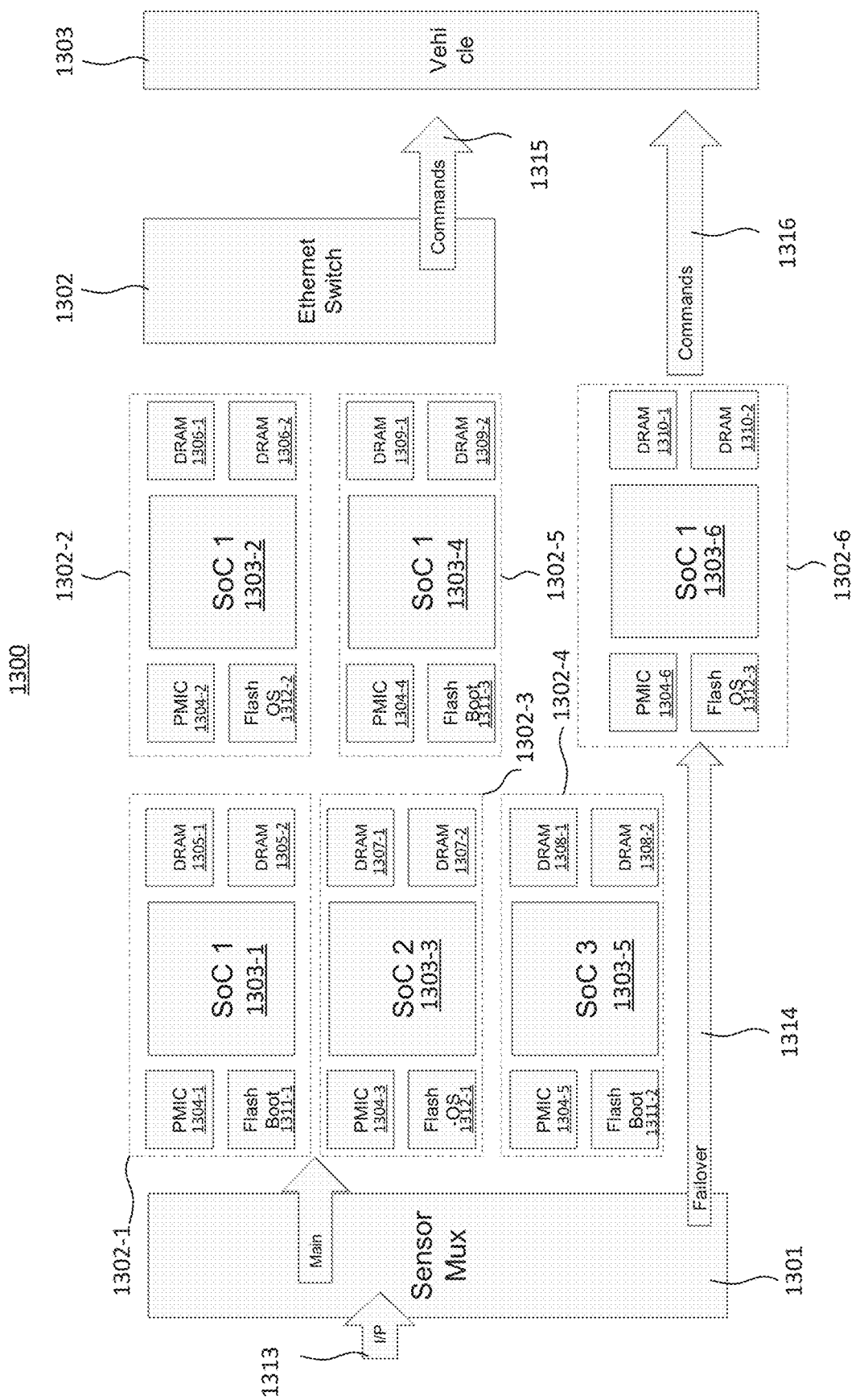
FIG. 13 is a block diagram of a chip layout of a compute unit for autonomous robotic systems, in accordance with one or more embodiments.

FIG. 13 is a block diagram of a chip layout of a compute unit 1300 for autonomous robotic systems, in accordance with one or more embodiments. Compute unit 1300 can be implemented in, for example, an AV compute (e.g., AV compute 202*f*). Compute unit 1300 includes sensor multiplexer (Mux) 1301, main compute clusters 1302-1 through 1302-5, failover compute cluster 1302-6 and Ethernet switch 1302. Ethernet switch 1302 includes a plurality of Ethernet transceivers for sending commands 1315 to vehicle 1303, where the commands 1315 are received by one or more of DBW system 202*h*, safety controller 202*g*, brake system 208, powertrain control system 204 and/or steering control system 206, as shown in FIG. 2.

A first main compute cluster 1302-1 includes SoC 1303-1, volatile memory 1305-1, 1305-2, power management integrated circuit (PMIC) 1304-1 and flash boot 1311-1. A second main compute cluster 1302-2 includes SoC 1303-2, volatile memory 1306-1, 1306-2 (e.g., DRAM), PMIC 1304-2 and flash Operating System (OS) 1312-2. A third main compute cluster 1302-3 includes SoC 1303-3, volatile memory 1307-1, 1307-2, PMIC 1304-3 and flash OS memory 1312-1. A fourth main compute cluster 1302-4 includes SoC 1303-5, volatile memory 1308-1, 1308-2, PMIC 1304-5 and flash boot memory 1311-2. A fifth main compute cluster 1302-5 includes SoC 1303-4, volatile memory 1309-1, 1309-2, PMIC 1304-4 and flash boot memory 1311-3. Failover compute cluster 1302-6 includes SoC 1303-6, volatile memory 1310-1, 1310-2, PMIC 1304-6 and flash OS memory 1312-3.

Each of the SoCs 1303-1 through 1303-6 can be a MPSoC as described in reference to FIGS. 1-12. SoCs 1303-1 through 1303-6 can share memory through a cache coherent fabric, as described in reference to FIG. 6.

In an embodiment, the PMICs 1304-1 through 1304-6 monitor relevant signals on a bus (e.g., a PCIe bus), and communicate with a corresponding memory controller (e.g., memory controller in a DRAM chip) to notify the memory controller of a power mode change, such as a change from a normal mode to a low power mode or a change from the low power mode to the normal mode. In an embodiment, PMICs 1304-1 through 1304-6 also receive communication signals from their respective memory controllers that are monitoring the bus, and perform operations to prepare the memory for lower power mode. When a memory chip is ready to enter low power mode, the memory controller communicates with its respective slave PMIC to instruct the slave PMIC to initiate the lower power mode.

In an embodiment, sensor mux 1301 receives and multiplexes sensor data (e.g., video data, LiDAR point clouds, RADAR data) from a sensor bus through a sensor interface 1313, which in some embodiments is a low voltage differential signaling (LVDS) interface. In an embodiment, sensor mux 1301 steers a copy of the video data channels (e.g., Mobile Industry Processor Interface (MIPI®) camera serial interface (CSI) channels), which are sent to failover compute cluster 1302-6. Failover compute cluster 1302-6 provides backup to the main compute clusters using video data to operate the AV, during a failover 1314, such as when one or more main compute clusters 1302-1 fail. In some such cases, failover compute cluster 1302-6 can issue commands 1316 to the vehicle 1303.

Compute unit 1300 is one example of a high-performance compute unit for autonomous robotic systems, such as AV computes, and other embodiments can include more or fewer clusters, and each cluster can have more or fewer SoCs, volatile memory chips, non-volatile memory chips, NPUs, GPUs, and Ethernet switches/transceivers.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Figure 14:
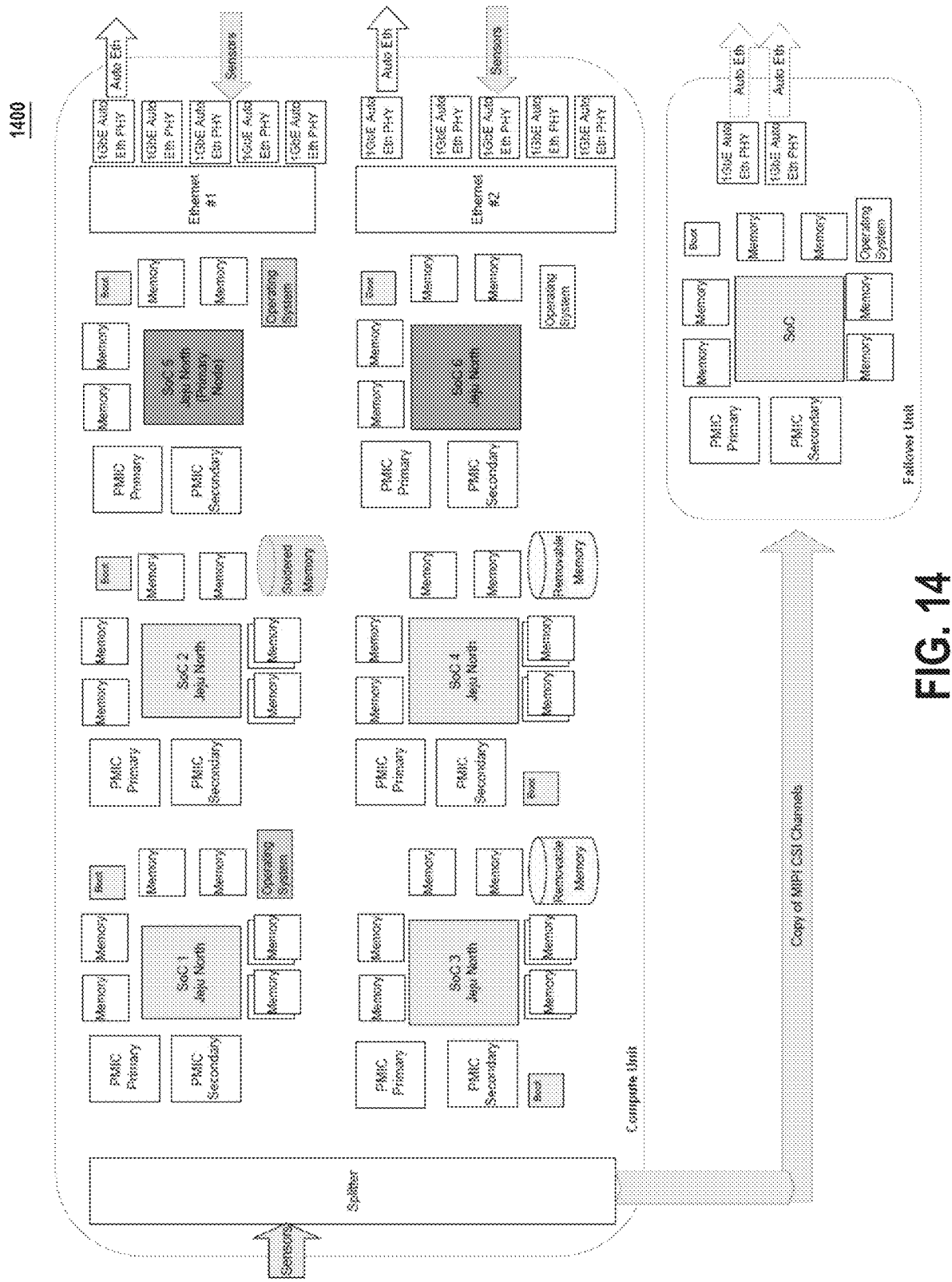
FIG. 14 is a block diagram illustrating an example of a computing system for autonomous robotic systems (e.g., an autonomous vehicle compute). fapp

FIG. 14 is a block diagram illustrating an example of a computing system for autonomous robotic systems (e.g., an autonomous vehicle compute). In the illustrated example, the computing system 1400 is implemented using a multi-SoC architecture and includes a plurality of SoCs. The computing system 1400 can receive sensor data associated with one or more sensors, and use the sensor data to implement one or more functions (e.g., implement a lane change, implement cruise control, implement voice navigation, etc.). The computing system 1400 may receive sensor data from sensors and supply the sensor data, via a splitter, to the compute unit and/or the failover unit. In the example of FIG. 14, the computing system 1400 includes one or more connections (e.g., Ethernet connections) to receive additional sensor data associated with one or more sensors (e.g., lidar data) via an Ethernet physical layer (e.g., an automotive Ethernet physical layer (Auto Eth PHY).

The computing system 1400 may include one or more SoCs. In the example of FIG. 14, the computing system 1400 includes seven SoCs. The computing system 1400 can include a first subset of the SoCs in the compute unit and a second subset of the SoCs in the failover unit. In the example of FIG. 14, the computing system 1400 include six SoCs in the compute unit and one SoC in the failover unit.

Not shown in FIG. 14, the computing system 1400 may include an isolated execution environment manager. As discussed herein, the isolated execution environment manager may partition all or a portion of the one or more SoCs and may assign functions to particular partitions of the one or more SoCs for implementation. For example, the isolated execution environment manager may partition an SoC into a first partition corresponding to a first isolated execution environment instance for implementation of a first function and a second partition corresponding to a second isolated execution environment instance and a third isolated execution environment instance for implementation of a second function.

The computing system 1400 may include one or more power management integrated circuits (PMICs) to manage power supplied to the one or more SoCs. For example, the computing system 1400 may include a primary PMIC and/or a secondary PMIC for all or a portion of the one or more SoCs.

All or a portion of the SoCs can include memory. An SoC can include volatile and/or non-volatile storage. For example, an SoC can include removable memory, RAM (e.g., low-power double data rate synchronous dynamic RAM), flash memory, etc. The memory may store boot instructions (e.g., boot code, a boot loader, a boot drive, boot code, etc.), an operating system, etc.

Software-Defined Compute Nodes on Multi-SoC Architectures

Figure 15:
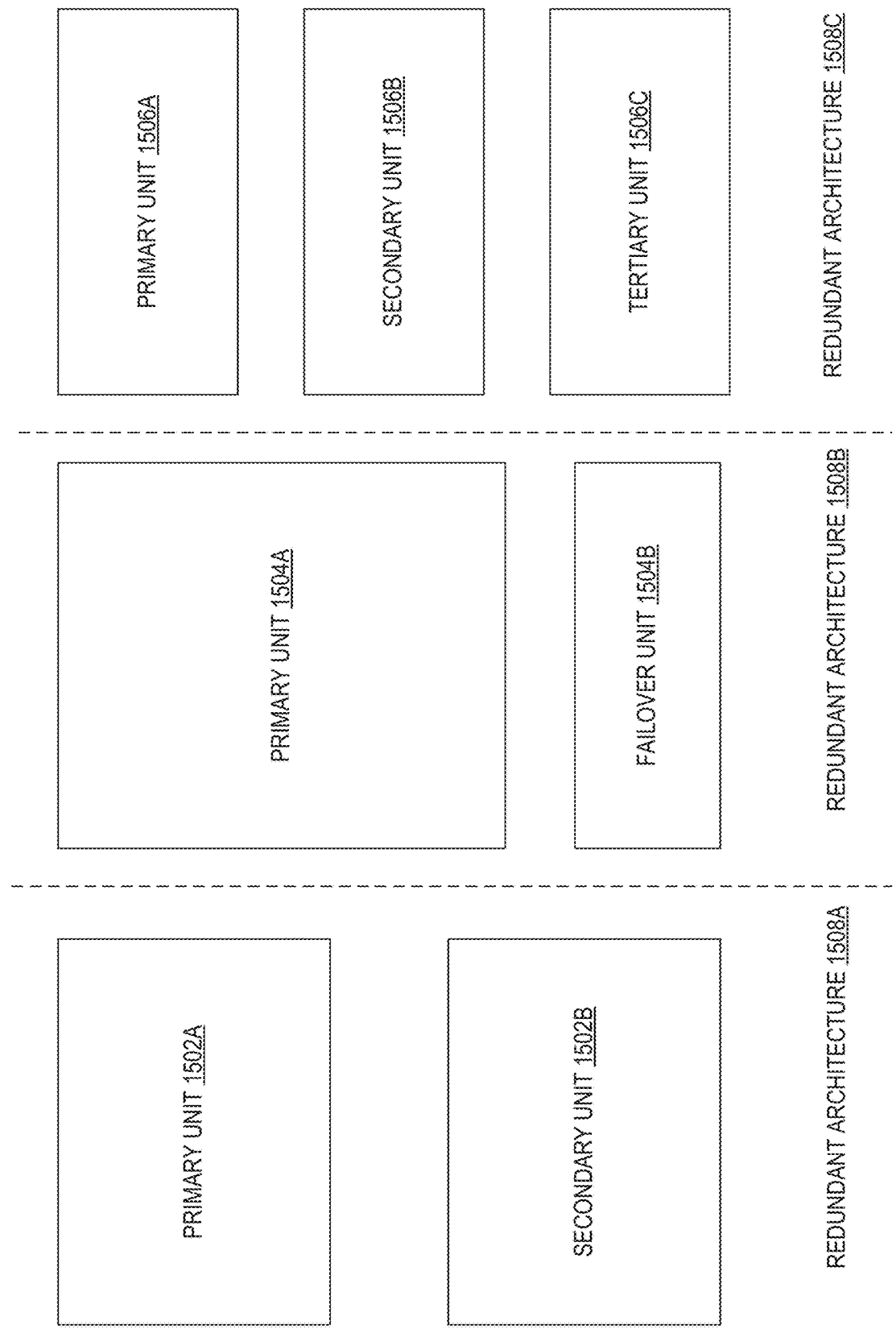
FIG. 15 is a block diagram illustrating an example of a redundant architecture.

As discussed above, a multi-SoC architecture as described herein may be used to implement a variety of functions, and may be particularly suited to applications where high requirements exist as to reliability and responsiveness. One example of such an application is an autonomous vehicle, where real-time responsiveness and very high resiliency may be critical for safe operation. In real-time, safety-critical architectures, a variety of different physical configurations may be used to satisfy needs of the application. Examples of such architectures are shown in FIG. 15, as redundant architectures 1508A-C. Each redundant architecture 1508 includes at least two units configured to operate redundantly. For example, redundant architecture 1508A includes a primary unit 1502A and a secondary unit 1502B. Each of the primary unit 1502A and the secondary unit 1502B may conduct the same or similar operations. Thus, if one of the units 1502 fails, the other may continue operation. Redundant architecture 1508B is similar to architecture 1508A, except that the primary unit 1504A is paired with a relatively less powerful failover unit 1504B. The failover under 1504B may, for example, have access to fewer compute resources (e.g., CPU power and memory) than the primary unit 1504A, and may thus support fewer functions than the primary unit 1504A. For example, the failover under 1504B may duplicate only safety-critical functions of the primary unit 1504A, such that if failure of the primary unit 1504A occurs non-safety-critical functions are halted. The redundant architecture 1508C is similar to architecture 1508A, except that an additional tertiary unit 1506C is added. The additional tertiary unit 1506C may provide for even further safety, such that the architecture 1508C can continue operating even under failure of two of the three units 1506. Additionally or alternatively, the architecture 1508C may provide for quorum-based operation, such that each unit 1506 feeds a result of processing to an arbiter (e.g., the primary unit 1506 or another processing unit not shown in FIG. 15), which selects a result provided by a majority of the units 1506.

Each of the architectures 1508 of FIG. 15 thus provide for high resiliency, high consistency operation for real-time safety-critical applications. However, the architectures 1508 of FIG. 15 are typically hardwired, and thus must be adapted to each particular circumstance. This, in turn, means that a physical system providing one of the architectures in FIG. 15 cannot generally be repurposed to implement an alternative architecture, limiting the extensibility of these architectures.

Embodiments of the present disclosure address these problems by providing for software-defined computing nodes on a multi-SoC architecture, such as the architecture 100 of FIG. 1. Specifically, as disclosed herein, individual SoCs on a multi-SoC architecture may be logically interconnected to form a set of software-defined nodes, each of which is useable as an independent computing device. SoCs associated with different nodes may operate independently, such that failure of an SoC in any given node does not result in failure of other nodes. SoCs associated with an individual node may operate collectively, such that the compute resources available at a node can be expanded according to the number of SoCs assigned to the node. Thus, a given physical multi-SoC architecture may be reconfigured to provide each of redundancy configurations of FIG. 15 (among other possible configurations), or multiple such configurations concurrently.

Figure 16:
FIG. 16 is a block diagram illustrating an example of how SoCs within a multi-SoC architecture may be logically grouped into distinct computing nodes.

FIG. 16 provides a visual depiction of how SoCs within a multi-SoC architecture may be logically grouped into distinct computing nodes. Specifically, FIG. 16 depicts nine SoCs 1602A-1602I (individually or collectively referred to as SoC(s) 1602), which may be MPSoCs similar to those described with respect to FIG. 1. While not shown in FIG. 16, the SoCs 1602 may be linked to various other inputs and outputs, such as sensor interfaces, network interfaces, etc. Moreover, the SoCs 1602 may be linked via interconnects, such as PCIe or UCIe interconnects. In one embodiment, the SoCs 1602 are interlinked via a mesh topology, such that each SoC 1602 can independently communicate with each other SoC 1602. In other embodiments, other topologies may be used. Furthermore, the SoCs 1602 of FIG. 16 may be specifically configured for real-time, safety-critical applications. For example, each SoC 1602 may implement a deterministic processing architecture. In some instances, SoCs 1602 may include internally-redundant hardware to further provide resiliency. For example, each SoC 1602 may include a safety co-processor configured to monitor health of the SoC 1602 and report a failure of the SoC 1602 to other SoCs 1602, such that (for example) another SoC 1602 can takeover operations of the failed SoC 1602.

As shown in FIG. 16, the SoCs 1602 can be logically arranged within nodes 1604, such as nodes 1604A-1604G (individually or collectively referred to as node(s) 1604). Each node 1604 may operate as a single computing device. For example, each node 1604 may share a common memory space, execute a single operating system, etc. Distinct nodes 1604 can operate as different computing devices, and thus maintain distinct memory spaces, execute different computing devices, etc. Accordingly, by grouping SoCs 1602 together into a single node 1604, the computing resources of the SoCs 1602 may be shared within that node 1604. For example, node 1604A in FIG. 16 includes two SoCs 1602 (SoC 1602A and SoC 1602D), and thus represents a logical computing device with the processors, memory, etc., available to those two SoCs 1602. Conversely, by dividing SoCs between distinct nodes 1604, distinct logical computing devices can be created. For example, nodes 1604A and 1604B may not share a memory space, processors, etc. Thus, failure of an SoC 1602 within node 1604A—including physical failures such as actual destruction of an SoC 1602—may be expected not to result in failure of node 1604B. As disclosed herein, the groupings of SoC 1602 into nodes 1604 may be reconfigurable within a multi-SoC architecture. Accordingly, while a single example arrangement in shown in FIG. 16, a single multi-SoC architecture can be reconfigured to implement any number of distinct nodes 1604 without requiring physical rearrangement of the architecture.

Due to the flexibility provided by software-defined nodes within a multi-SoC architecture, a single physical configuration can provide for any of the redundancy architectures of FIG. 15, among other redundancy architectures, or a combination of such architectures. For example, nodes 1604A and B may collectively implement redundant architecture 1508B of FIG. 15 (e.g., where node 1604A has greater compute resources than node 1604B by virtue of being implemented as two SoCs 1602 as opposed to a single SoC 1602). Nodes 1604C and 1604D may collectively implement redundant architecture 1508A, providing for two computing units with equal compute resources. Nodes 1604E-G may collectively implement redundant architecture 1508C of FIG. 15 by providing three equally powerful compute units (e.g., such that node 1604E implements primary unit 1506A, node 1604F implements secondary unit 1506B, etc.). Should the needs of a given application change, the configuration of SoCs 1602 into nodes may also change. For example, should a safety-critical issue arise and an extra computing node 1604 be required, an existing node may be reconfigured to reduce the amount of computing resources of the node 1604, and free up such resources for an additional node 1604. For example, functionality of node 1604A may be reduced, and an SoC 1602 may be removed from that node 1604A and associated with a new node 1604. Moreover, due to the flexibility of the architecture, additional SoCs 1602 may be included for further safety. For example, FIG. 16 shows an SoC 1602 unassociated with any node 1604. Such an SoC 1602 may be maintained in reserve in case of unmanageable failure of another SoC 1002. Illustratively, in an autonomous vehicle application, failure of an individual SoC 1602 within a given node 1604 may cause the vehicle to halt and reconfigure the multi-SoC architecture to replace the failed SoC 1602 with a reserve SoC 1602, thus enabling continued safe operation.

While a single reserve SoC 1602 is shown in FIG. 16, any number of SoCs 1602 may be held in reserve. Moreover, any combination of nodes 1604A may be created from available SoCs 1602, which each node including one or more SoCs 1602. Still further, any combination of nodes 1604 may be combined into a redundant group, which group includes two or more nodes 1604 operating redundantly. Thus, the ability to create software-defined nodes on a multi-SoC architecture can provide for high configurability and adaptability to a wide variety of applications.

Because nodes 1604 operate as independent computing devices, nodes 1604 can be used in place of a variety of other computing devices. For example, a node 1604 may be used in place of a single SoC 1602 or a cluster of SoCs 1602. Additionally or alternatively, a node 1604 may be used in place of a generic processor (e.g., a central processing unit, or CPU), providing for increased reliability and redundancy. For example, a node 1604 may replace any of the processors described in the context of autonomous vehicles in U.S. patent application Ser. No. 18/139,256, entitled "SCALABLE CONFIGURABLE CHIP ARCHITECTURE" and filed Apr. 26, 2023 or U.S. patent application Ser. No. 18/139,857 entitled "DISTRIBUTED COMPUTING ARCHITECTURE WITH SHARED MEMORY FOR AUTONOMOUS ROBOTIC SYSTEMS" and filed Apr. 26, 2023, the entireties of which are hereby incorporated by reference herein. In some embodiments, nodes 1604 may be implemented in conjunction with other computing devices. For example, a node 1604 may be used to conduct real-time or safety-critical functions while another processor (e.g., external to a multi-SoC architecture) is used for non-real-time or non-safety-critical functions.

In one embodiment, the arrangement of SoCs 1602 into nodes 1604 is facilitated by middleware that initializes the SoCs 1602 into nodes. Middleware may, for example, take the form of software providing a virtualized computing environment on which nodes 1604 are created as virtualized, which environment is enabled by the middleware to utilize the compute resources of the SoCs 1602. However, in some contexts, continuously executing middleware may inhibit efficient operation of nodes 1604, such as by adding overhead resource usage. To avoid such overhead, in some embodiments middleware configures SoCs 1602 during an initialization phase, and halts execution thereafter. For example, each SoC 1602 may, during initialization, initialize memory mapping information indication a memory space associated with the SoC 1602. When multiple SoCs 1602 are combined to form a node 1604, the middleware may initialize the memory mapping information for the multiple SoCs 1602 to utilize a shared memory space, thus enabling the multiple SoCs 1602 to act as a single, multi-core computing device. For SoCs 1602 that are not combined within a node 1604, memory mapping information may be separated to isolate the devices. In some instances, each node 1604 may further be configured to interact with other nodes 1604 via a multi-device protocol, such as by exchange of network data over a non-transparent bridge that facilitates communication of the nodes 1604 via, for example, PCIe while maintaining a distinct memory space between the nodes 1604.

Figure 17:
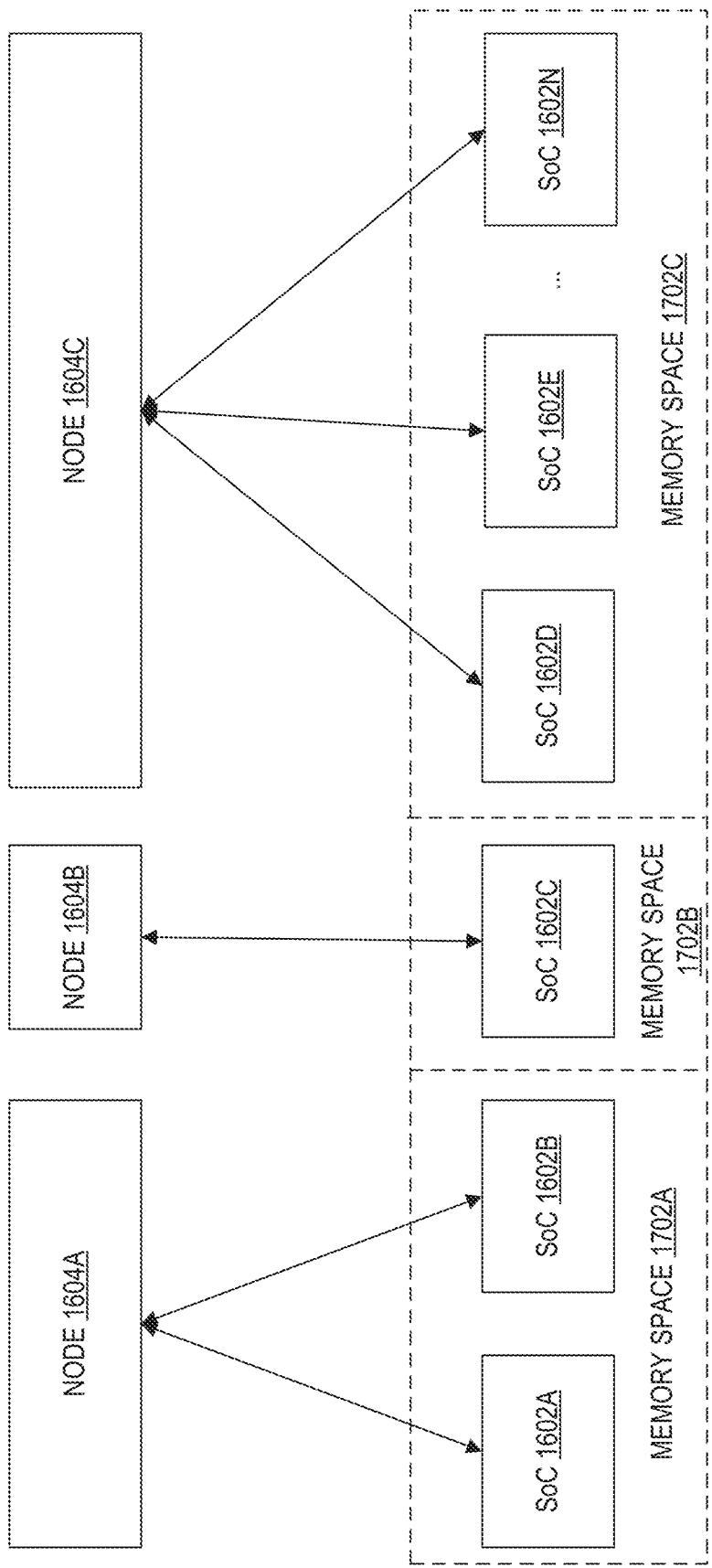
FIG. 17 is a block diagram illustrating an example of a potential configuration of nodes and SoCs that may be established during initialization.

FIG. 17 depicts one potential configuration of nodes 1604 and SoCs 1602 that may be established during initialization. Specifically, FIG. 17 depicts three nodes, nodes 1604A-C. Each node 1604 in FIG. 17 corresponds to one or more SoCs 1602 as shown therein. Each SoC 1602 corresponding to a given node 1604 has an associated shared memory space 1702. For example, SoCs 1602A and 1602B correspond to node 1604A, and share memory space 1702A. SoC 1602C corresponds to node 1604B, and has memory space 1702B. Node 1604C corresponds to SoCs 1602D-N, which share memory space 1702C. Boundaries between memory spaces are shown as dashed lines in FIG. 17, such that SoCs 1602 that do not share a memory space 1702 exchange information as distinct computing devices. Accordingly, software (e.g., operating systems and applications therein, bare metal applications, etc.) may execute within a given memory space 1702, treating a corresponding node 1604 as a distinct unit of computation. This enables high resiliency for execution of such software, since failure of any given SoC 1602, including physical destruction of the SoC 1602, can be expected to effect software executing on a corresponding node 1604. Thus, arrangement of SoCs 1602 into redundant groups can provide for resiliency similar to the physical architectures of FIG. 15, without requiring physical reconfiguration for each desired application.

Figure 18:
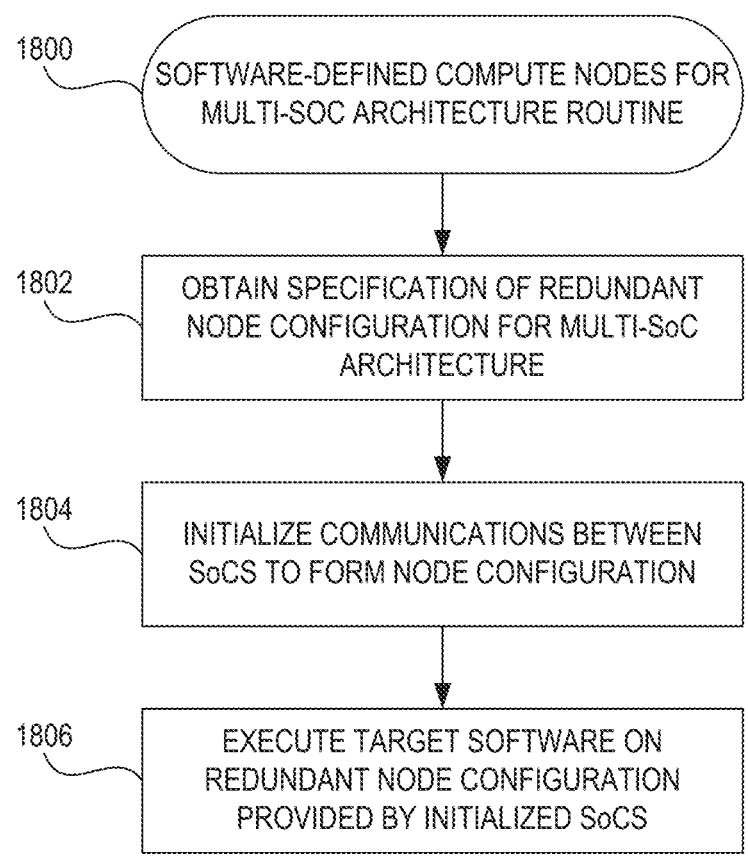
FIG. 18 is a flow diagram illustrating an example of a routine for implementing software-defined compute nodes on a multi-SoC architecture.

With reference to FIG. 18, an illustrative routine 1800 will be described for implementing software-defined compute nodes on a multi-SoC architecture, such as the architecture 160 of FIG. 18. The routine 1800 may illustratively be performed by the multi-SoC architecture. For example, a first SoC 1602 within the architecture may be designated as a lead SoC 1602 for purposes of initialization of the architecture.

The routine 1800 begins at block 1802, where the multi-SoC architecture obtains a specification of a redundant node configuration for the architecture. Illustratively, the configuration may be authored by an operator of the multi-SoC architecture and stored within a persistent or substantially persistent memory coupled to and in communication with the multi-SoC architecture (e.g., a hard disk drive, read-only-memory including erasable programmable read-only-memory, etc.). The configuration may specify one or more computing nodes, and a number of SoCs to be associated with each node. In some embodiments, the configuration specifies particular SoCs within the architecture to associate to each node. For example, the configuration may specify that SoCs 1, 3, and 5 form a first node, that SoCs 2 and 4 form a second node, that SoC 6 forms a third node, etc. In another embodiment, the configuration does not specify particular SoCs, and the multi-SoC architecture is configured to map particular SoCs to the requested nodes during the routine 1800. In some instances, the configuration may specify a particular role of each node. For example, the configuration may specify that multiple nodes are to be combined into a redundant architecture, such as the architectures of FIG. 15. In other instances, redundancy may be established by individual configuration of nodes (e.g., by software executing on each node subsequent to initialization).

At block 1804, the multi-SoC architecture initializes communications between SoCs to form the node configuration indicated within the obtained specification. Illustratively, a memory configuration of the SoCs may be established such that SoCs that are grouped within a node share a memory space, while SoCs across nodes interact via a device-to-device protocol (e.g., via a PCIe non-transparent bridge). Accordingly, the SoCs may be formed into multiple nodes logically representing multiple computing devices, with each logic computing device having physically isolated computing resources and thus, in effect, operating as an independent physical computing device.

Thereafter, at block 1806, the multi-SoC architecture executes target software on the initialized SoCs. For example, the multi-SoC architecture may utilize multiple nodes in a redundant node configuration, e.g. such that processing of one node is duplicated on one or more other nodes. Accordingly, the multi-SoC architecture may provide for resiliency and redundancy similar to a custom-engineered physical architecture, while enabling the architecture to be altered via software, without physical reconfiguration.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A computer-implemented method comprising:
    obtaining a specification of a redundant node configuration for a multiprocessor-system-on-a-chip architecture, wherein the redundant node configuration specifies at least a first logical computing node implementing redundant operations using at least two multiprocessor-systems-on-a-chip, each of the at least two multiprocessor-systems-on-a-chip comprising multiple processors;
    initializing, based on the specification of the redundant node configuration, communications between the at least two multiprocessor-systems-on-a-chip to form the redundant node configuration implementing redundant operations using the at least two multiprocessor-systems-on-a-chip; and
    executing target computer-executable instructions on the redundant node configuration corresponding to the at least two multiprocessor-systems-on-a-chip in communication according to the specification of the redundant node configuration.

2. The computer-implemented method of claim 1, wherein the at least two multiprocessor-systems-on-a-chip communicate via a cache coherent fabric.

3. The computer-implemented method of claim 1, wherein each multiprocessor-system-on-a-chip is associated with a distinct memory, and wherein the at least two multiprocessor-systems-on-a-chip share data between respective distinct memories via transparent mirroring of logical memory addresses.

4. The computer-implemented method of claim 1 further comprising:
    obtaining a specification of an alternate redundant node configuration;
    reconfiguring communications between the at least two multiprocessor-systems-on-a-chip to form the alternate redundant node configuration; and
    executing target computer-executable instructions on the alternate redundant node configuration.

5. The computer-implemented method of claim 1, wherein the least two multiprocessor-systems-on-a-chip comprises at least three multiprocessor-systems-on-a-chip, wherein the redundant node configuration implements at least two logical computing nodes implementing redundant operations, and wherein a first logical computing node of the at least two logical computing nodes is implemented using at least two of the at least three multiprocessor-systems-on-a-chip.

6. The computer-implemented method of claim 5, wherein a second logical computing node of the at least two logical computing nodes redundantly implements safety-critical operations of the first logical computing node.

7. The computer-implemented method of claim 6, wherein the at least two logical computing nodes comprise a third logical computing node implementing the safety-critical operations of the first logical computing node.

8. The computer-implemented method of claim 7, wherein the first, second, and third logical computing nodes are configured to implement the safety-critical operations in a quorum-based manner.

9. The computer-implemented method of claim 1, wherein the target computer-executable instructions implement operations of an autonomous vehicle.

10. The computer-implemented method of claim 1, wherein the at least two multiprocessor-systems-on-a-chip are physically interconnected via a mesh topology network.

11. The computer-implemented method of claim 1, wherein at least one of the multiprocessor-systems-on-a-chip implements a deterministic processing architecture.

12. The computer-implemented method of claim 1, wherein initializing communications between at least two multiprocessor-systems-on-a-chip to form the redundant node configuration comprises creating a shared memory space among physical memory of the at least two multiprocessor-systems-on-a-chip.

13. The computer-implemented method of claim 1, wherein initializing communications between at least two multiprocessor-systems-on-a-chip to form the redundant node configuration comprises executing middleware software during initialization of the at least two multiprocessor-systems-on-a-chip and halting execution of the middleware software prior to executing the target computer-executable instructions.

14. The computer-implemented method of claim 1 further comprising:
    detecting a failure on a first multiprocessor-system-on-a-chip of the at least two multiprocessor-systems-on-a-chip;
    initializing communications between a second multiprocessor-system-on-a-chip of the at least two multiprocessor-systems-on-a-chip and a third multiprocessor-system-on-a-chip to re-form the redundant node configuration; and
    executing the target computer-executable instructions on the reformed redundant node configuration.

15. A system-on-a-chip, comprising:
    memory storing computer-executable instructions; and
    at least one processor configured to:
        obtain a specification of a redundant node configuration for the system-on-a-chip, wherein the redundant node configuration specifies at least a first logical computing node implementing redundant operations using at least the system-on-a-chip and at least one other system-on-a-chip;
        initialize, based on the specification of the redundant node configuration, the system-on-a-chip by initiating communications with the at least one other system-on-a-chip to form the redundant node configuration implementing the redundant operations using at least the system-on-a-chip and at least one other system-on-a-chip; and execute target computer-executable instructions on the system-on-a-chip in accordance with the redundant node configuration corresponding to at least the system-on-a-chip and at least one other system-on-a-chip in communication according to the specification of the redundant node configuration.

16. The system-on-a-chip of claim 15, wherein the system-on-a-chip is associated with a memory distinct from memory of the at least one other system-on-a-chip, and wherein initiating communications with the at least one other system-on-a-chip to form the redundant node configuration comprises initializing transparent mirroring of logical memory addresses with the at least one other system-on-a-chip.

17. The system-on-a-chip of claim 15, wherein the at least one processor is further configured to:
  detect a failure on the at least one other system-on-a-chip;
  initialize communications with an additional system-on-a-chip to re-form the redundant node configuration; and
  execute the target computer-executable instructions on the reformed redundant node configuration.

18. One or more non-transitory computer-readable media comprising instructions that, when executed on a system-on-a-chip, cause the system-on-a-chip:
  obtain a specification of a redundant node configuration for the system-on-a-chip, wherein the redundant node configuration specifies at least a first logical computing node implementing redundant operations using at least the system-on-a-chip and at least one other system-on-a-chip;
  initialize, based on the specification of the redundant node configuration, the system-on-a-chip by initiating communications with the at least one other system-on-a-chip to form the redundant node configuration implementing the redundant operations using at least the system-on-a-chip and at least one other system-on-a-chip; and
  execute target computer-executable instructions on the system-on-a-chip in accordance with the redundant node configuration corresponding to at least the system-on-a-chip and at least one other system-on-a-chip in communication according to the specification of the redundant node configuration.

19. The one or more non-transitory computer-readable media of claim 18, wherein the instructions further cause the system-on-a-chip to initialize communications between the system-on-a-chip and an additional system-on-a-chip via a device-to-device protocol.

20. The one or more non-transitory computer-readable media of claim 18, wherein the target computer-executable instructions implement operations of an autonomous vehicle.

* * * * *